(12) United States Patent
Zou

(10) Patent No.: US 11,284,009 B2
(45) Date of Patent: Mar. 22, 2022

(54) CAMERA ASSEMBLY, CONTROL METHOD OF CAMERA ASSEMBLY AND ELECTRONIC APPARATUS

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/059,613

(22) PCT Filed: Mar. 6, 2020

(86) PCT No.: PCT/CN2020/078195
§ 371 (c)(1),
(2) Date: Nov. 30, 2020

(87) PCT Pub. No.: WO2020/192393
PCT Pub. Date: Oct. 1, 2020

(65) Prior Publication Data
US 2021/0218900 A1 Jul. 15, 2021

(30) Foreign Application Priority Data
Mar. 28, 2019 (CN) .......................... 201910242318.3

(51) Int. Cl.
*H04N 5/232* (2006.01)
*G06F 1/16* (2006.01)
(Continued)

(52) U.S. Cl.
CPC ....... *H04N 5/23299* (2018.08); *G06F 1/1686* (2013.01); *H04N 5/2251* (2013.01); *H04N 5/2257* (2013.01); *H04M 1/0264* (2013.01)

(58) Field of Classification Search
CPC ......... H04M 2250/20; H04M 2250/52; H04M 1/0264; H04N 5/23299; H04N 5/2257; H04N 5/2251; G06F 1/1686
See application file for complete search history.

(56) References Cited

U.S. PATENT DOCUMENTS

2002/0044216 A1*  4/2002  Cha .................... G06F 1/1616
                                                    348/376

FOREIGN PATENT DOCUMENTS

| CN | 202395840 | 8/2012 |
|----|-----------|--------|
| CN | 203984539 | 12/2014 |

(Continued)

OTHER PUBLICATIONS

PCT International Search Report (w/ English translation) for corresponding PCT Application No. PCT/CN2020/078195, dated May 25, 2020, 5 pages.

(Continued)

*Primary Examiner* — Nelson D. Hernández Hernández
(74) *Attorney, Agent, or Firm* — Dority & Manning, P.A.

(57) ABSTRACT

A camera assembly includes a camera module, a front shaft device, and a forward turning drive device. The camera module includes a strip-shaped body, and the strip-shaped body includes a front end portion, a rear end portion, and a lens located at a top of the strip-shaped body between the front end portion and the rear end portion. The front shaft device includes at least one front shaft, and each front shaft is adapted to pivotally engaging with the front end portion. The front shaft pivotally engages with the front end portion, and the forward turning drive drives the camera module to pivot forward around the front shaft, so that the camera module rotates to be in a front capture state where the rear end portion is lifted and the lens finds views forward.

19 Claims, 13 Drawing Sheets

(51) Int. Cl.
    *H04N 5/225*    (2006.01)
    *H04M 1/02*    (2006.01)

(56)    References Cited

FOREIGN PATENT DOCUMENTS

| | | |
|---|---|---|
| CN | 107995336 | 5/2018 |
| CN | 207819982 | 9/2018 |
| CN | 108712541 | 10/2018 |
| CN | 208386716 | 1/2019 |
| CN | 208434002 | 1/2019 |
| CN | 208623712 | 3/2019 |
| WO | WO 2006/103595 | 10/2006 |

OTHER PUBLICATIONS

First Office Action (w/ English translation) for corresponding Chinese Application No. CN 201910242318.3, 15 pages.

* cited by examiner

CAMERA ASSEMBLY, CONTROL METHOD OF CAMERA ASSEMBLY AND ELECTRONIC APPARATUS

CROSS-REFERENCE TO RELATED APPLICATIONS

This application is a national phase entry under 35 USC 371 of International Patent Application No. PCT/CN2020/078195 filed on Mar. 6, 2020, which is proposed based on Chinese Patent Application No. 201910242318.3, filed on Mar. 28, 2019, and claims priority to the above Chinese Patent Application, which are incorporated herein by reference in their entirety.

TECHNICAL FIELD

The present application relates to the field of electronic technologies, and in particular, to a camera assembly, a control method of the camera assembly, and an electronic apparatus.

BACKGROUND

Electronic apparatuses, such as mobile phones, achieve a front camera function and a rear camera function by using at least two cameras, which makes costs of mobile phones high. With regard to a front camera of a mobile phone, it is typically necessary to provide a view finding opening corresponding to the front camera in a display screen of the mobile phone, which limits a screen-to-body ratio of the mobile phone. Meanwhile, due to limitations of the structure, arrangement, etc., pixels of the front camera and rear camera of the mobile phone are inconsistent, so that effect of pictures obtained by the front camera and rear camera of the mobile phone is different, which affects experience effect.

SUMMARY

The present application aims to at least solve one of the technical problems in the related art. For this purpose, the present application provides a camera assembly. The camera assembly enriches camera functions of an electronic apparatus, which is beneficial to reducing costs, and facilitates realization of a full screen display of the electronic apparatus.

The present application further provides a control method of a camera assembly.

The present application further provides an electronic apparatus having the camera assembly described above.

The present application further provides an electronic apparatus.

According to embodiments of a first aspect of the present application, a camera assembly is provided. The camera assembly is applied to an electronic apparatus and includes: a camera module, a front shaft device and a forward turning drive device. The camera module includes a front end portion, a rear end portion, and a lens located at a top of the camera module between the front end portion and the rear end portion. The front end portion, the rear end portion and the lens are sequentially disposed along a front-to-rear direction. The front shaft device includes at least one front shaft, and each front shaft is adapted to pivotally engaging with the front end portion. The forward turning drive device drives the camera module to pivot forward around the front shaft in a case where the front shaft pivotally engages with the front end portion, so that the camera module rotates to be in a front capture state where the rear end portion is lifted and the lens finds views forward.

The camera assembly according to the embodiments of the present application, by arranging the front shaft device and the forward turning drive device, the forward turning drive device may drive the camera module to pivot forward around the front shaft in a case where the front shaft pivotally engages with the front end portion, so that the camera module rotates to the front capture state where the rear end portion is lifted and the lens finds views forward. When applied to the electronic apparatus, the camera assembly enriches camera functions of the electronic apparatus, and the costs of the electronic apparatus may be reduced, the full screen display of the electronic apparatus is facilitated.

According to some embodiments of the present application, the forward turning drive device includes: a seat; a slider, a drive, and a pushing member. The slider is in a shape of an arc and disposed on the seat to rotate around a center of the arc; the drive is used to push the slider to rotate clockwise; the pushing member is disposed at one end of the arc of the slider, and the pushing member pushes the camera module to rotate to be in the front capture state in a process where the slider rotates clockwise.

According to some embodiments of the present application, the forward turning drive device further includes a reset member. The reset member is used to push the slider to rotate counterclockwise, and in a case where the camera module is in the front capture state, if the slider rotates counterclockwise, the camera module rotates back to a top capture state where the rear end portion drops down and the lens finds views upward.

According to some embodiments of the present application, the forward turning drive device further includes a position-limiting member. In a case where the camera module rotates to be in the front capture state, the position-limiting member at least restricts the slider from continuing to rotate clockwise.

According to some embodiments of the present application, the seat defines an arc-shaped slideway, and the slider is slidably arranged in the arc-shaped slideway.

According to some embodiments of the present application, the arc-shaped slideway extends along an arc shape thereof first downward and then upward along a direction from front to rear. A front end of the arc-shaped slideway is provided with a reset member, the middle of the arc-shaped slideway is provided with a position-limiting member, and a front end of the slider is provided with a permanent magnet that slides between the reset member and the position-limiting member. The reset member is an electromagnet and is used to push the slider to rotate counterclockwise. The position-limiting member is an electromagnet, and at least restricts the slider from continuing to rotate clockwise in a case where the camera module rotates to be in the front capture state. The drive is a spring connected between the reset member and the front end of the slider.

According to some embodiments of the present application, the pushing member is disposed outside the arc-shaped slideway and includes a first extending section and a second extending section. The first extending section extends outward from a rear end of the slider along a radial direction of the slider, and the second extending section extends from a tail end of the first extending section along an extending direction thereof and extends along a direction perpendicular to the first extending section towards a direction away from the slider.

According to some embodiments of the present application, a bottom face of the camera module has a sliding groove. In a process where the pushing member pushes the camera module to rotate, the pushing member slides along the sliding groove.

According to some embodiments of the present application, the front shaft device further includes a front driver. The front driver drives the front shaft to move between a position where the front shaft pivotally engages with the front end portion and a position where the front shaft disengages from the front end portion.

According to some embodiments of the present application, the front driver drives the front shaft to rotate back and forth along an axis direction of the front shaft.

According to some embodiments of the present application, the front driver includes a drive component and a reset component. The drive component drives the front shaft to move towards the position where the front shaft pivotally engages with the front end portion, and the reset component drives the front shaft to move towards the position where the front shaft disengages from the front end portion.

According to some embodiments of the present application, the front shaft is a permanent magnet, and the drive component includes an electromagnet. The reset component is a spring, and the reset component is connected between the drive component and the front shaft.

According to some embodiments of the present application, there are two front shafts that are symmetrically disposed at both sides of the front end portion in a left-right direction, and each front shaft is driven by one front driver.

According to some embodiments of the present application, the camera assembly further includes: a rear shaft device and a backward turning drive device. The rear shaft device includes a rear driver and a rear shaft, and the rear driver drives the rear shaft to move between a position where the rear shaft pivotally engages with the rear end portion and a position where the rear shaft disengages from the rear end portion. The backward turning drive device drives the camera module to pivot backward around the rear shaft in a case where the rear shaft pivotally engages with the rear end portion and the front shaft disengages from the front end portion, so that the camera module rotates to a rear capture state where the front end portion is lifted and the lens finds views backward.

According to some embodiments of the present application, a structure of the backward turning drive device is mirrored with a structure of the forward turning drive device, and the backward turning drive device and the forward turning drive device are spaced apart along a turning axis direction of the camera module.

According to some embodiments of the present application, a structure of the rear driver and a structure of the front driver are the same.

According to embodiments of a second aspect of the present application, a control method of a camera assembly is provided. The camera assembly is a camera assembly according to some embodiments of the present application described above. The control method includes the following steps; in a case where the camera module is used for top capture, keeping the forward turning drive device in an initial state and keeping the backward turning drive device in an initial state, so as to keep the camera module in a top capture state where the lens finds views upward; in a case where the camera module is used for front capture, driving, by the rear driver, the rear shaft to disengage from the rear end portion, and driving, by the front driver, the front shaft to pivotally engage with the front end portion, so that the backward turning drive device is in the initial state, and the forward turning drive device drives the camera module to rotate to be in the front capture state; and in a case where the camera module is used for rear capture, driving, by the front driver, the front shaft to disengage from the front end portion, and driving, by the rear driver, the rear shaft to pivotally engage with the rear end portion, so that the forward turning drive device is in the initial state, and the backward turning drive device drives the camera module to rotate to be in the rear capture state.

The control method of the camera assembly according to the embodiments of the present application is simple in logic, and easy to implement, and makes the camera module have functions of top capture, front capture and rear capture, which enriches camera functions of the camera assembly, reduces costs of the camera assembly, and realizes consistency of camera pixels in multiple view finding directions.

According to embodiments of a third aspect of the present application, an electronic apparatus is provided. The electronic apparatus includes an apparatus body and a camera assembly. The camera assembly is a camera assembly according to the embodiments of the first aspect of the present application, and the camera assembly is disposed on the apparatus body.

The electronic apparatus according to the embodiments of the present application makes the electronic apparatus have multiple capture angles by adopting the camera assembly, which enriches camera functions of the electronic apparatus, reduces costs, facilitates the realization of the full screen display of the electronic apparatus, and improves user experience.

According to some embodiments of the present application, a top wall of the apparatus body is formed with a groove that is recessed from top to bottom. Only a top of the groove is open, and the camera module is embedded in the groove. In a case where the camera module is in the top capture state where the lens finds views upward, a top face of the camera module is flush with the top wall of the apparatus body, and in a case where the camera module rotates to be in the front capture state, the rear end portion of the camera module rotates above the groove, and the lens is higher than the groove.

According to the embodiments of a fourth aspect of the present application, an electronic apparatus is provided. The electronic apparatus includes: an apparatus body including a display screen, a camera, a first shaft, a first driver, a second shaft, a second driver, a first turning drive, and a second turning drive. The display screen has a square structure and has a light exit side, an opposite side opposite to the light exit side and four outer peripheral sides. The display screen includes four outer edges, the outer edges are correspondingly located at the outer peripheral sides of the display screen respectively. The apparatus body is provided with a groove, the groove is located at the opposite side of the display screen and is located at at least one outer peripheral side of the display screen, and the groove is open towards a direction away from a center of the apparatus body. The camera is disposed in the groove and has a strip-shaped structure extending along a first direction, the strip-shaped structure includes a first end, a second end and a lens, and the first end, the lens and the second end are sequentially disposed along a second direction. The first direction is parallel to an extending direction of a plane where the outer edges of the display screen are located, and the second direction is a direction from the light exit side of the display screen to the opposite side of the display screen, and is perpendicular to the first direction. The first shaft is disposed between the first end and a first driver, and is used for pivotally engaging with the first end. The first driver is disposed in the groove and connected to the first shaft, and the first driver is configured to drive the first shaft to pivotally engage with the first end or drive the first shaft to disengage from the first end. The second shaft is disposed between the second end and the second driver, and is used for pivotally engaging with the second end. The second driver is disposed in the groove and connected to the second shaft, and the second driver is configured to drive the second shaft to pivotally engage with the second end or drive the second shaft to disengage from the second end. The first turning drive has a strip-shaped arc structure, and the first turning drive rotates around a center of an arc curve of the first turning drive. One end of the first turning drive along a circumferential direction is formed as a first drive end, and the first drive end cooperates with the second end, so that the first turning drive drives the camera to rotate around the first shaft to be in a first capture state, and in the first capture state, the second end is lifted and the lens finds views towards the light exit side of the display screen. The second turning drive has a strip-shaped arc structure, and the second turning drive rotates around a center of an arc curve of the second turning drive. One end of the second turning drive along a circumferential direction is formed as a second drive end, and the second drive end cooperates with the first end, so that the second turning drive drives the camera to rotate around the second shaft to be in a second capture state, and in the second capture state, the first end is lifted and the lens finds views towards the opposite side of the display screen.

The electronic apparatus according to the embodiments of the present application is rich in camera functions and low in costs, which facilitates the realization of the full screen display of the electronic apparatus.

According to some embodiments of the present application, a seat is arranged on an outer side of the first turning drive, the seat is in a shape of an arc, and the first turning drive rotates around the center of the arc curve of the first turning drive relative to the seat. Another end of the first turning drive in the circumferential direction is formed as a first free end, and an elastic member is disposed between the first free end and a corresponding end of the seat in the circumferential direction. A pushing member is arranged at the first drive end, and the pushing member abuts against the second end; and the elastic member is used to push the first turning drive to rotate in a positive direction, so as to drive the pushing member to push the camera to rotate to be in the first capture state.

According to some embodiments of the present application, a magnet is arranged at the first free end, and a first electromagnet is arranged at one end of the seat in a circumferential direction corresponding to the first free end. The first electromagnet cooperates with the magnet to push the first turning drive to rotate in a reverse direction, so that the camera rotates from the first capture state to a third capture state. In the third capture state, the second end drops down to be aligned with the first end, and the lens finds views towards an outer peripheral side of the display screen.

According to some embodiments of the present application, a second electromagnet is disposed in the seat; and the second electromagnet is disposed in a middle of the seat in a circumferential direction, and cooperates with the magnet to at least limit a positive rotation angle of the first turning drive.

According to some embodiments of the present application, the pushing member is disposed outside the seat and includes a first extending section and a second extending section. The first extending section extends outward from the first drive end along a radial direction of the first turning drive, and the second extending section extends from a tail end of the first extending section along an extending direction thereof and extends along a direction perpendicular to the first extending section towards a direction away from the first turning drive.

According to some embodiments of the present application, the first driver drives the first shaft to rotate back and forth along an axis direction of the first shaft, the second driver drives the second shaft to rotate back and forth along an axis direction of the second shaft, and both the axis direction of the first shaft and the axis direction of the second shaft are parallel to the first direction.

According to some embodiments of the present application, there are two first drivers that are symmetrically disposed at both sides of the camera along the first direction. Each first driver drives one first shaft to move, and the first driver includes a third electromagnet and a spring. The third electromagnet drives the first shaft to move towards a position where the first shaft pivotally engages with the first end, and the spring drives the first shaft to move towards a position where the first shaft disengages from the first end.

According to some embodiments of the present application, a structure of the second turning drive and a structure of the first turning drive are the same and disposed in a mirroring manner, the second turning drive and the first turning drive are spaced apart along the first direction, and a structure of the second driver and a structure of the first driver are the same.

According to some embodiments of the present application, the four outer peripheral sides of the display screen are an upper side, a lower side, a left side and a right side; the groove is formed at a top of the apparatus body and is located at the upper side of the display screen, and a through hole is formed in a bottom wall of the groove; and the lens is electrically connected to the apparatus body through a flexible circuit board, and the flexible circuit board penetrates through the through hole.

According to some embodiments of the present application, the electronic apparatus further includes a controller. The controller is connected to the first driver, the second driver, the first turning drive and the second turning drive. The controller is configured to control the camera to switch to the first capture state when receiving a front capture instruction, control the camera to switch to the second capture state when receiving a rear capture instruction, and control the camera to switch to the third capture state when receiving a lateral capture instruction. When receiving the lateral capture instruction, the controller controls the first turning drive and the second turning drive to be in the initial state, so that the lens finds views towards an outer peripheral side of the display screen. When receiving the front capture instruction, the controller controls the second driver to drive the second shaft to disengage from the second end, controls the first driver to drive the first shaft to pivotally engage with the first end, and controls the second turning drive to be in the initial state and the first turning drive to rotate in a positive direction, so as to drive the camera to rotate to be in the first capture state. When receiving the rear capture instruction, the controller controls the first driver to drive the first shaft to disengage from the first end, controls the second driver to drive the second shaft to pivotally engage with the second end, and controls the first turning drive to be in the initial state and the second turning drive to rotate in a reverse direction, so as to drive the camera to rotate to be in the second capture state.

Additional aspects and advantages of the present application will be partially given in the following descriptions, part of which will be more clear from the following descriptions, or will be known through practice of the present application.

BRIEF DESCRIPTION OF THE DRAWINGS

The above-mentioned and/or additional aspects and advantages of the present application will become clear and easy to understand from the following descriptions of the embodiments with reference to accompanying drawings, in which.

REFERENCE SIGNS

Figure 1:
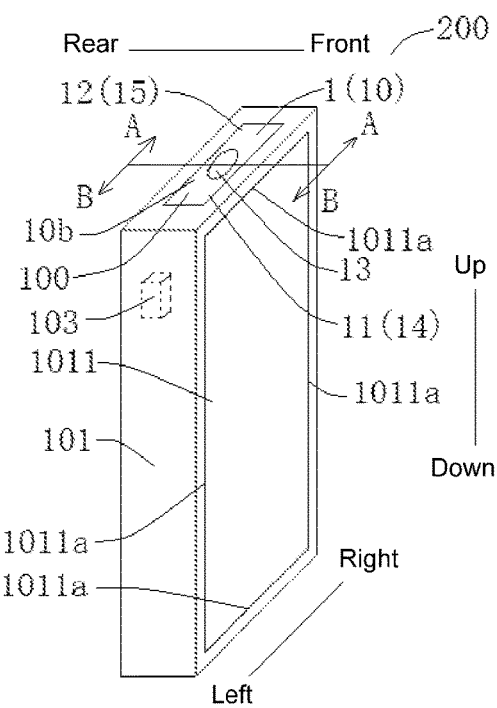
FIG. 1 is a schematic diagram showing a structure of an electronic apparatus, according to an embodiment of the present application, in which a camera is in a top capture state.

Electronic apparatus 200;
Apparatus body 101; Groove 101a; Through hole 101b; Display screen 1011; Outer edge 1011a;
Flexible circuit board 102; Controller 103;
Camera assembly 100;
Permanent magnet 100a; Electromagnet 100b; Electromagnetic coil 100c; Magnet 100e;
Camera module 1; Camera 10; Strip-shaped structure 10a; Strip-shaped body 10b;
   Front end portion 11; Rear end portion 12; Lens 13; First end 14; Second end 15;
Front shaft device 2; Front shaft 21; Front driver 22; First shaft 23; First driver 24;
   Drive component 221; Reset component 222;
   Third electromagnet 241; Spring 242;
Forward turning drive device 3;
   Seat 31; Slider 32; Drive 33; Pushing member 34; Reset member 35; Position-limiting member 36;
   First turning drive 37; Elastic member 38;
   First electromagnet 391; Second electromagnet 392;
      Arc-shaped slideway 311; First extending section 341; Second extending section 342;
   First drive end 371; First free end 372;
Rear shaft device 4; Rear shaft 41; Rear driver 42; Second shaft 43; Second driver 44;
   Rear drive component 421; Rear reset component 422;
Backward turning drive device 5;
   Rear seat 51; Rear slider 52; Rear drive 53; Rear pushing member 54;
   Rear reset member 55; Rear position-limiting member 56; Second turning drive 57;
      Rear arc-shaped slideway 511; Third extending section 541; Fourth extending section 542; and
      Second drive end 571.

DETAILED DESCRIPTION

The embodiments of the present application are described below in detail. Examples of the embodiments are illustrated in accompanying drawings, in which consistently same or similar marks indicate same or similar elements, or elements with same or similar functions. The embodiments described below with reference to the accompanying drawings are explanatory only for explaining the present application, and shall not be regarded as limitations to the present application.

A camera assembly 100 according to the embodiments of the present application will be described below with reference to FIGS. 1 to 4.

As shown in FIGS. 1 to 4 and 12, the camera assembly 100 according to the embodiments of the present application includes a camera module 1 front shaft devices 2, and a forward turning drive device 3.

The camera module 1 includes a front end portion 11, a rear end portion 12, and a lens 13 located between the front end portion 11 and the rear end portion 12 at a top. The front shaft device 2 includes a front shaft 21 that may be disposed corresponding to the front end portion 11 of the camera module 1, and the front shaft 21 is adapted to pivotally engaging with the front end portion 11, so that the camera module 1 may rotate around an axis of the front shaft 21 in a case where the front shaft 21 pivotally engages with the front end portion 11.

The camera module 1 includes a strip-shaped body 10b. The strip-shaped body 10b includes the front end portion 11 proximate to a light exit side of an electronic apparatus 200, the rear end portion 12 proximate to an opposite side of the light exit side of the electronic apparatus 200, and the lens 13 located between the front end portion 11 and the rear end portion 12 at a top of the strip-shaped body 10*b*.

In a case where the front shaft 21 pivotally engages with the front end portion 11, the forward turning drive device 3 may drive the camera module 1 to pivot forward around the front shaft 21, so that the camera module 1 rotates until the rear end portion 12 is lifted and to be in a front capture state where the lens 13 finds views forward. That is, in a case where the camera module 1 is in the front capture state, both the rear end portion 12 and the lens 13 are lifted upwards, and the lens 13 finds views forward. Thus, by arranging the front shaft device 2 and the forward turning drive device 3, the camera module 1 may rotate around the front shaft 21 from an initial state to the front capture state, so that the camera assembly 100 may have multiple view finding directions (or capture directions), and a switch of multiple view finding directions is realized. In a case where the camera assembly 100 is applied to the electronic apparatus 200, the electronic apparatus 200 has multiple capture angles and ensures that effect of pictures taken at multiple capture angles is consistent, thereby improving user experience. The camera assembly 100 may be switched to an appropriate capture state according to users' requirements, and there is no need to provide lens(es) 13 at different view finding directions, which reduces costs of the electronic apparatus 200. Besides, when switched to the front capture state, the camera module 1 may be used as a front camera of the electronic apparatus 200. Since both the rear end portion 12 and the lens 13 are lifted upwards when the camera module 1 is in the front capture state, a position of the lens 13 changes in a height direction. For example, the lens 13 may be made to rotate to a position higher than an upper end face of the electronic apparatus 200. As a result, there is no need to provide a view finding opening corresponding to the lens 13 in a display screen of the electronic apparatus 200, which is beneficial to improving a screen-to-body ratio of the electronic apparatus 200, and facilitates realization of the full screen display of the electronic apparatus 200.

In a case where the camera module 1 is in the initial state, the lens 13 may be disposed upward. In this case, the camera module 1 may be in a top capture state where the lens 13 finds views upward. The front shaft 21 is adapted to pivotally engage with the front end portion 11, which may be understood that, the front shaft 21 may be used for pivotally engaging with the front end portion 11.

It will be noted that, in a case where the camera module 1 rotates to be in the front capture state, the lens 13 finding views forward may include the lens 13 horizontally finding views forward and the lens 13 obliquely finding views forward. The lens 13 obliquely finding views forward means that the lens 13 faces forward and a view finding direction of the lens 13 is oblique relative to a horizontal direction. A direction "front/forward" refers to a side of the electronic apparatus 200 facing a user when the user uses the electronic apparatus 200 in a case where the camera assembly 100 is applied to the electronic apparatus 200, and an opposite direction thereof is defined as "rear/backward".

The camera assembly 100 according to the embodiments of the present application, by arranging the front shaft devices 2 and the forward turning drive device 3, the forward turning drive device 3 may drive the camera module 1 to pivot forward around the front shafts 21 in a case where the front shafts 21 pivotally engage with the front end portion 11, so as to make the camera module 1 rotate to be in the front capture state where the rear end portion 12 is lifted and the lens 13 finds views forward. When the camera assembly 100 is applied to the electronic apparatus 200, the camera functions of the electronic apparatus 200 may be enriched, the costs of the electronic apparatus 200 may be reduced, and the full screen display of the electronic apparatus 200 may be realized.

In some embodiments of the present application, as shown in FIGS. 3 to 8, the forward turning drive device 3 includes a seat 31, a slider 32, a drive 33 and a pushing member 34. In a case where the camera module 1 is in the initial state, the forward turning drive device 3 may be located under the camera module 1. The slider 32 is in the shape of an arc and the slider 32 is disposed on the seat 31 to rotate around a center C of the arc. The drive 33 may be disposed on at least one of the seat 31 and the slider 32, and the drive 33 is used to push the slider 32 to rotate clockwise. The pushing member 34 is disposed at one end of the arc of the slider 32, that is, the pushing member 34 is disposed at one end of the slider 32 along its circumferential direction. One end of the pushing member 34 may cooperate with the camera module 1. In a process where the slider 32 rotates clockwise, the pushing member 34 may rotate clockwise along with the slider 32 to push the camera module 1 to rotate to be in the front capture state. Therefore, the drive 33 drives the slider 32 to rotate to push the camera module 1 to rotate around the front shafts 21, and rotation of the camera module 1 is realized, which may ensure that the camera module 1 smoothly rotates to be in the front capture state. By arranging the pushing member 34, the slider 32 indirectly pushes the camera module 1 to rotate, and thereby the occupied space of the slider 32 is saved to some extent, so as to facilitate an arrangement of the slider 32.

It should be noted that, "clockwise" and "counterclockwise" are orientations based on the accompanying drawings and are merely to facilitate and simplify the description of the present application, and are not to indicate or imply that the slider 32 must have a specific rotation direction. Therefore, they should not be construed as limitations to the present application.

Figure 6:
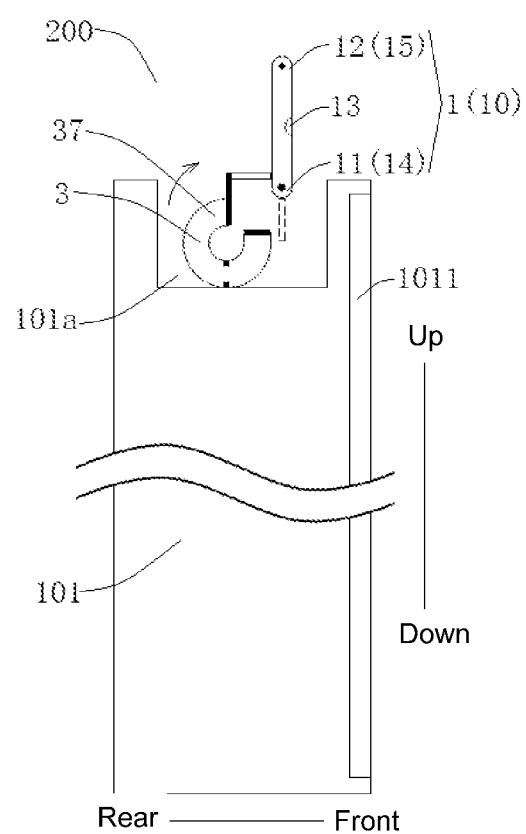
FIG. 6 is a schematic diagram after a camera in FIG. 5 turns forward.
Figure 7:
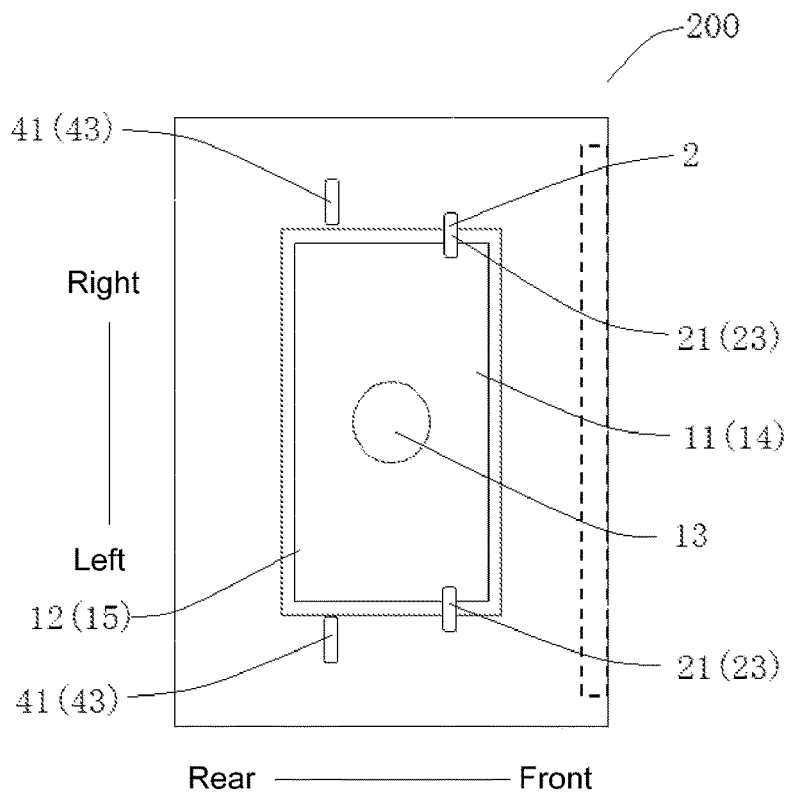
FIG. 7 is a schematic diagram before the camera in FIG. 5 turns forward.
Figure 8:
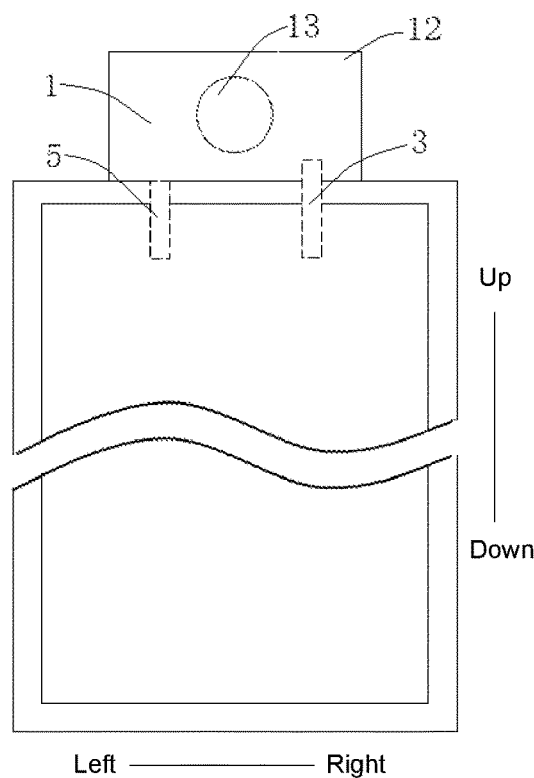
FIG. 8 is a front view of an electronic apparatus after the camera in FIG. 6 turns forward.

Further, as shown in FIGS. 6 to 8, the forward turning drive device 3 further includes a reset member 35. The reset member 35 may be disposed on at least one of the seat 31 and the slider 32, and the reset member 35 is used to push the slider 32 to rotate counterclockwise, so as to realize a reset of the slider 32. In a case where the camera module 1 is in the front capture state, if the slider 32 rotates counterclockwise, the camera module 1 rotates back to be in the top capture state where the rear end portion 12 drops down and the lens 13 finds views upward, which further ensures the switch of the camera assembly 100 among multiple view finding directions, and improves practicability of the camera assembly 100.

It will be understood that, in a case where the camera module 1 is in the front capture state, if the slider 32 rotates counterclockwise, the camera module 1 may be driven to be in the top capture state through the reset member 35, or may be rotated back to be in the top capture state through operation of the user, which is not limited thereto.

Further, the forward turning drive device 3 further includes a position-limiting member 36. In a case where the camera module 1 rotates to be in the front capture state, the position-limiting member 36 at least restricts the slider 32 from continuing to rotate clockwise. For example, as shown in FIGS. 6 and 7, the position-limiting member 36 may be disposed on the seat 31. In a case where the slider 32 rotates clockwise relative to the seat 31 to push the camera module 1 to rotate to be in the front capture state, the slider 32 may cooperate with the position-limiting member 36, and the slider 32 cannot continue to rotate clockwise. The camera module 1 may be kept in the front capture state, and the stability of the camera module 1 in the front capture state may be guaranteed. Meanwhile, the position-limiting member 36 can limit a rotation angle of the slider 32, thereby controlling a rotation angle of the camera module 1, which further makes the camera module 1 have an appropriate angle for finding views when rotating to be in the front capture state, thereby improving user experience.

Figure 3:
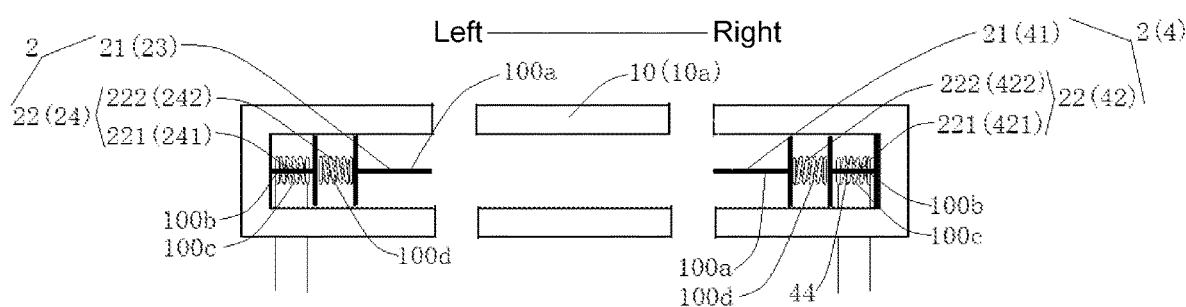
FIG. 3 is a schematic diagram showing that a first shaft and a first driver (or a second shaft and a second driver) of the electronic apparatus shown in FIG. 1 cooperate with the camera, in which the first shaft (or the second shaft) is located at a position where the first shaft (or the second shaft) is disengaged from a first end (or a second end)

For example, in examples shown by FIGS. 3 and 6, in a case where the camera module 1 is in the initial state, the camera module 1 may be horizontally disposed, and the lens 13 finds views upward. The position-limiting member 36 may limit the slider 32 to rotate 90° clockwise relative to the seat 31, so that the camera module 1 may rotate 90° from the initial state to the front capture state. As shown in FIG. 8, in this case, the camera module 1 may be vertically arranged, and the lens 13 may horizontally find views forward, so as to better match the user's use habits. Of course, in a case where the camera module 1 is in the initial state, the camera module 1 may be arranged non-horizontally; and in a case where the camera module 1 rotates to be in the front capture state, the camera module 1 may be arranged non-vertically.

The position-limiting member 36 at least restricting the slider 32 from continuing to rotate clockwise may include that the position-limiting member 36 is only used to restrict the slider 32 from continuing to rotate clockwise, and may also include that the position-limiting member 36 is not only used to restrict the slider 32 from continuing to rotate clockwise, but also, for example, has a function of pushing the slider 32 to rotate counterclockwise, that is, the position-limiting member 36 further has a function of resetting the slider 32.

Figure 13:
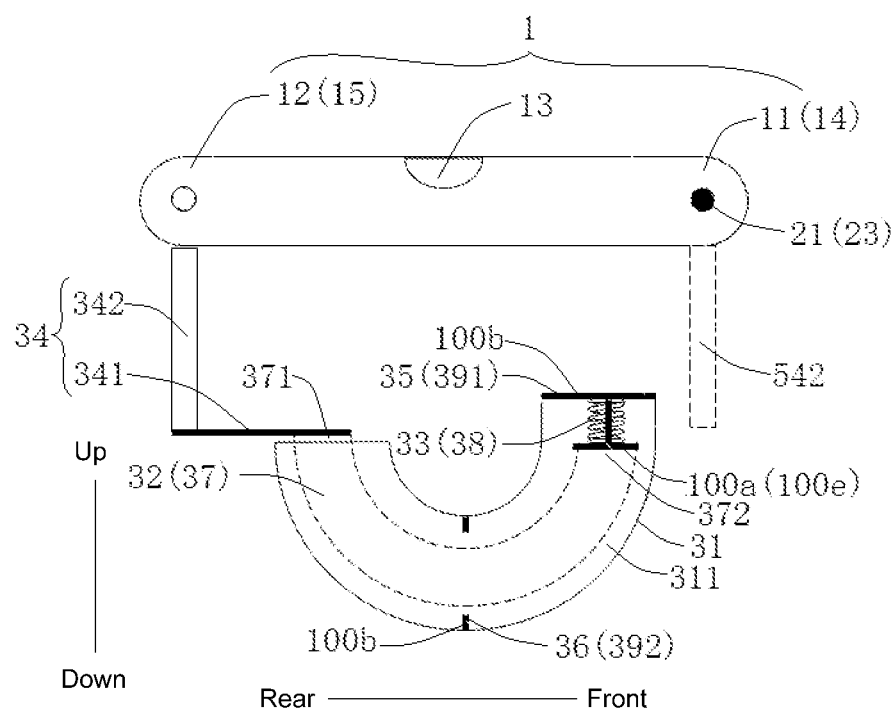
FIG. 13 is a schematic diagram showing an action of a first turning drive shown in FIG. 2.

For example, in examples shown by FIGS. 6, 7 and 13, the seat 31 defines an arc-shaped slideway 311, and at least one end of the arc-shaped slideway 311 in a circumferential direction may be open. The slider 32 is slidably arranged in the arc-shaped slideway 311, and a curvature of the arc corresponding to the slider 32 may be the same as a curvature of the arc-shaped slideway 311, so that the arc-shaped slideway 311 has a certain position-limiting effect on the slider 32 to ensure that the slider 32 rotates around the center C. In a process where the slider 32 slides relative to the arc-shaped slideway 311, the drive 33 may push the slider 32 to slide out upward from a rear end of the arc-shaped slideway 311, so that a portion of the slider 32 is fitted with the arc-shaped slideway 311 and another portion extends out of the arc-shaped slideway 311, so as to drive the camera module 1 to rotate.

It will be understood that, one of a guide groove and a guide protrusion may be formed in a wall surface of the arc-shaped slideway 311, and the other one of the guide groove and the guide protrusion may be formed in an outer wall of the slider 32. The guide groove extends along an extending direction of the arc-shaped slideway 311, and the guide protrusion cooperates with the guide groove and slides along the guide groove, which further ensures that the slider 32 may slide relative to the arc-shaped slideway 311. Besides, to a certain extent, due to position-limiting effect of the guide groove and the guide protrusion, it is possible to properly reduce the matching precision between the arc-shaped slideway 311 and the slider 32 on the premise that the slider 32 is prevented from shaking during a sliding process, which facilitates installation of the slider 32 and the seat 31.

Of course, the arc-shaped slideway 311 and the slider 32 may not be provided with a guide groove and a guide protrusion.

In a case where the forward turning drive device 3 includes the reset member 35, the reset member 35 may pull the slider 32 downward back into the arc-shaped slideway 311 in a process where the slider 32 slides relative to the arc-shaped slideway 311. In a case where the forward turning drive device 3 includes the position-limiting member 36, the position-limiting member 36 may be disposed on the wall surface of the arc-shaped slideway 311, so as to restrict the slider 32 from continuing to rotate clockwise.

For example, in examples shown by FIGS. 6 to 8 and 13, the arc-shaped slideway 311 extends along the arc shape thereof first downward and then upward in a direction from the front to the rear. The reset member 35 is disposed at a front end of the arc-shaped slideway 311, and the position-limiting member 36 is disposed at the middle of the arc-shaped slideway 311. A permanent magnet 100a is disposed at a front end of the slider 32 and the permanent magnet 100a slides between the reset member 35 and the position-limiting member 36. The reset member 35 is an electromagnet 100b, and the electromagnet 100b is used to push the slider 32 to rotate counterclockwise. The position-limiting member 36 is an electromagnet 100b, and at least restricts the slider 32 from continuing to rotate clockwise when the camera module 1 rotates to be in the front capture state. The drive 33 is a spring connected between the reset member 35 and the front end of the slider 32.

For example, in a case where the camera module 1 is in the initial state, most portion of the slider 32 is fitted in the arc-shaped slideway 311, so that the permanent magnet 100a at the front end of the slider 32 is disposed close to the reset member 35. In this case, the drive 33 may be in a compression state. In a case where the camera module 1 is required to rotate to be in the front capture state, the reset member 35 may be powered off, and the slider 32 rotates clockwise under the action of an elastic force of the drive 33. In a case where the permanent magnet 100a at the front end of the slider 32 rotates to the middle of the arc-shaped slideway 311 or to be close to the middle of the arc-shaped slideway 311, the position-limiting member 36 is powered on, and the position-limiting member 36 exerts an attractive force on the permanent magnet 100a, so as to attract the permanent magnet 100a and restrict the slider 32 from continuing to rotate clockwise. In this case, the camera module 1 is kept in the front capture state. In a case where the camera module 1 is required to switch from the front capture state to the initial state, the position-limiting member 36 is powered off and the reset member 35 is powered on. The reset member 35 may exert an attractive force on the permanent magnet 100a to make the slider 32 rotate counterclockwise. In this process, the slider 32 needs to overcome the elastic force of the drive 33 to perform work.

Of course, the drive 33, the position-limiting member 36 and the reset member 35 may further be formed into other structures, which is not limited thereto.

For example, the drive 33 may include the electromagnet 100b at the front end of the arc-shaped slideway 311 and the spring between the seat 31 and the slider 32, and both the position-limiting member 36 and the reset member 35 may be the electromagnet 100b at the middle of the arc-shaped slideway 311. In a case where the camera module 1 is in the initial state, the spring may be in a compression state, and the electromagnet 100b at the front end of the arc-shaped slideway 311 is powered on and exerts a pushing force on the permanent magnet 100a at the front end of the slider 32 to make the slider 32 rotate clockwise under the action of the pushing force and the elastic force of the spring. In a case where the permanent magnet 100a at the front end of the slider 32 rotates to the middle of the arc-shaped slideway 311 or to be close to the middle of the arc-shaped slideway 311, the position-limiting member 36 is powered on, and the position-limiting member 36 exerts the attractive force on the permanent magnet 100a to attract the permanent magnet 100a and restrict the slider 32 from continuing to rotate clockwise. In this case, the camera module 1 is kept in the front capture state. In a case where the camera module 1 is required to switch from the front capture state to the initial state, the position-limiting member 36 is powered on and the current in the position-limiting member 36 has a reversed direction. The position-limiting member 36 may exert a repulsive force on the permanent magnet 100a to make the slider 32 rotate counterclockwise. In this process, the slider 32 needs to overcome the elastic force of the spring to perform work.

For another example, the drive 33 is an electromagnet 100b at the front end of the arc-shaped slideway 311, the reset member 35 is a spring between the seat 31 and the slider 32, and the position-limiting member 36 is an electromagnet 100b at the middle of the arc-shaped slideway 311. In a case where the camera module 1 is in the initial state, the drive 33 is powered on and exerts the pushing force on the permanent magnet 100a at the front end of the slider 32 to make the slider 32 rotate clockwise under the action of the pushing force. In a case where the permanent magnet 100a at the front end of the slider 32 rotates to the middle of the arc-shaped slideway 311 or to be close to the middle of the arc-shaped slideway 311, the position-limiting member 36 is powered on, and the position-limiting member 36 exerts an attractive force on the permanent magnet 100a to attract the permanent magnet 100a and restrict the slider 32 from continuing to rotate clockwise. In this case, the camera module 1 is kept in the front capture state, and the reset member 35 is in a stretched state. In a case where the camera module 1 is required to switch from the front capture state to the initial state, the position-limiting member 36 is powered off and the drive 33 is powered off. The reset member 35 may exert a pulling force on the slider 32 to make the slider 32 rotate counterclockwise.

It will be understood that, applications of the electromagnet 100b are not limited thereto, and the electromagnet 100b is not limited to only one state when the electromagnet 100b is powered on during usage. That is, a direction of the current in the electromagnet 100b may change to assist a motion of the slider 32.

For example, as shown in FIGS. 6, 7 and 13, the pushing member 34 is disposed outside the arc-shaped slideway 311, and the pushing member 34 includes a first extending section 341 and a second extending section 342. The first extending section 341 extends outward from a rear end of the slider 32 along a radial direction of the slider 32, and the second extending section 342 starts from a tail end of the first extending section 341 along an extending direction thereof and extends along a direction perpendicular to the first extending section 341 towards a direction away from the slider 32. A tail end of the second extending section 342 along an extending direction thereof may cooperate with the camera module 1 to push the camera module 1 to rotate, and both the first extending section 341 and the second extending section 342 may extend along a straight line, so that the pushing member 34 is substantially formed in an L-shaped structure, which simplifies a structure of the pushing member 34, and further benefits to reducing the occupied space of the seat 31 and the slider 32, and avoids interference between the camera module 1 and the seat 31 during the rotation of the camera module 1.

It will be noted that, a direction "outside" may refer to a direction away from the center C of the arc.

In some embodiments of the present application, a bottom face of the camera module 1 has a sliding groove, and the sliding groove may be formed by recessing part of the bottom face of the camera module 1. In a process where the pushing member 34 pushes the camera module 1 to rotate, the pushing member 34 slides along the sliding groove, so that the sliding groove may have a certain position-limiting effect on the pushing member 34. The pushing member 34 may stably and reliably push the camera module 1 to rotate.

For example, a width of the sliding groove may gradually increase along a recessing direction of the sliding groove, so that a width of an opening of the sliding groove is the smallest, and one end of the pushing member 34 is fitted with the sliding groove. As a result, the sliding groove may further effectively limit the pushing member 34 in a case where one end of the pushing member 34 is fitted with the sliding groove, which prevents the pushing member 34 from disengaging from the camera module 1, and ensures that the pushing member 34 reliably cooperates with the camera module 1. Meanwhile, in a case where the forward turning drive device 3 includes the reset member 35, the pushing member 34 may drive the camera module 1 to rotate to be in the initial state when rotating counterclockwise along with the slider 32, which is convenient for realizing an automatic reset of the camera module 1. The sliding groove may be a dovetail groove, which is not limited thereto.

It will be understood that, the bottom face of the camera module 1 may not have the sliding groove, and in this case, the pushing member 34 may abut against the bottom face of the camera module 1 (directly or indirectly), which may also push the camera module 1 to rotate. In a case where the forward turning drive device 3 includes the reset member 35, the camera module 1 is in the front capture stat, and if the rear end portion 12 is located behind the front end portion 11 in a front-rear direction, then when the slider 32 rotates counterclockwise, the camera module 1 may be automatically reset under the action of its own gravity. If the rear end portion 12 is not located behind the front end portion 11 in the front-rear direction, for example, in the front-rear direction, the rear end portion 12 is aligned with the front end portion 11 or the rear end portion 12 is located in front of the front end portion 11, then when the slider 32 rotates counterclockwise, the user may manually rotate the camera module 1 to assist the reset of the camera module 1.

In further embodiments of the present application, the front shaft device 2 further includes a front driver 22. The front driver 22 drives the front shaft 21 to move between a position where the front shaft 21 pivotally engages with the front end portion 11 and a position where the front shaft 21 disengages from the front end portion 11. For example, as shown in FIGS. 3, 9 to 13, the front shaft 21 moves between a fitting position and a separation position. In a case where the front driver 22 drives the front shaft 21 to move to the fitting position, the front shaft 21 pivotally engages with the front end portion 11, and in this case, the camera module 1 may rotate around the front shaft 21 to be in the front capture state. In a case where the front driver 22 drives the front shaft 21 to move to the separation position, the front shaft 21 disengages from the front end portion 11, and in this case, the front shaft 21 does not limit the front end portion 11, and the camera module 1 may rotate towards other directions. Therefore, by arranging the front driver 22 to drive the front shaft 21 to move between the fitting position and the separation position, a pivoting direction of the camera module 1 is more flexible, which is conducive to improving diversity of capture angles of the camera module 1, and makes the camera assembly 100 have a wider application range.

It will be noted that, the front driver 22 driving the front shaft 21 to move may include the front driver 22 driving the front shaft 21 to move and/or rotate, which is not limited thereto, as long as it can ensure that the front driver 22 may drive the front shaft 21 to move between the fitting position and the separation position.

In some embodiments of the present application, the front driver 22 drives the front shaft 21 to reciprocate along an axis direction of the front shaft 21, For example, as shown in FIGS. 3, 9 to 13, the axis of the front shaft 21 may extend along a straight line, and the front driver 22 may drive the front shaft 21 to reciprocate along the axis of the front shaft 21. In a case where the front shaft 21 moves to the fitting position, at least part of the front shaft 21 may be inserted into the front end portion 11. In a case where the front shaft 21 moves to the separation position, the front shaft 21 completely disengages from the front end portion 11. It therefore simplifies the motion of the front shaft 21, and is beneficial to simplifying the structure of the front driver 22, and saving occupied space of the front driver 22. As a result, it is beneficial to reducing occupied space of the camera assembly 100. When the camera assembly 100 is applied to the electronic apparatus 200, it is beneficial to a reasonable layout of the electronic apparatus 200.

Of course, the front diver 22 may further drive the front shaft 21 to rotate back and forth, which may also realize that the front shaft 21 pivotally engages with and disengages from the front end portion 11. For example, the axis of the front shaft 21 may extend along an arc, and the front driver 22 may drive the front shaft 21 to rotate along an extending direction of the axis of the front shaft 21. For another example, the front shaft 21 may be substantially formed in an L-shaped structure, and the front driver 22 may drive the front shaft 21 to rotate around one end of the front shaft 21, so that the other end of the front shaft 21 moves between a position where the front shaft 21 pivotally engages with the front end portion 11 and a position where the front shaft 21 disengages from the front end portion 11, which is not limited thereto.

Figure 9:
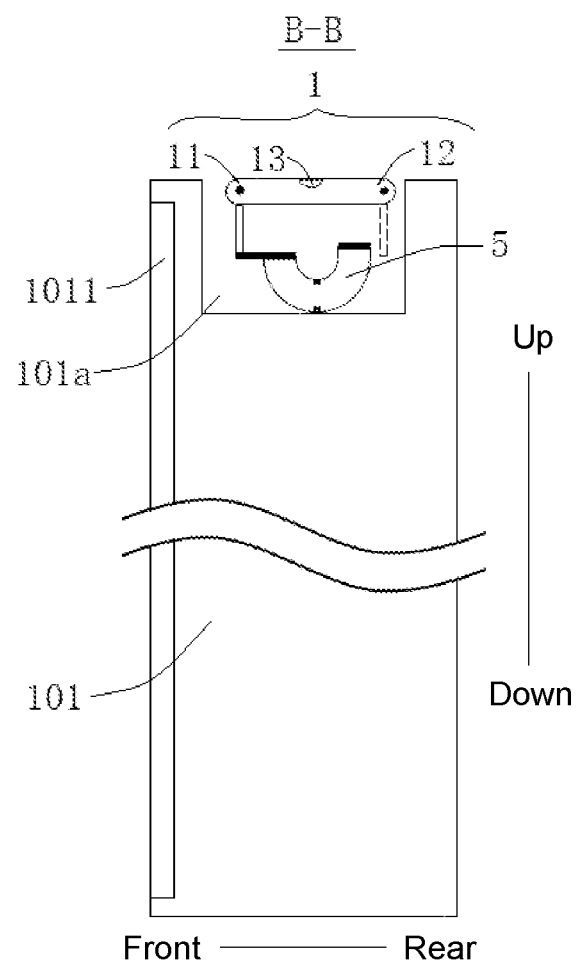
FIG. 9 is a section taking along line B-B in FIG. 1.
Figure 10:
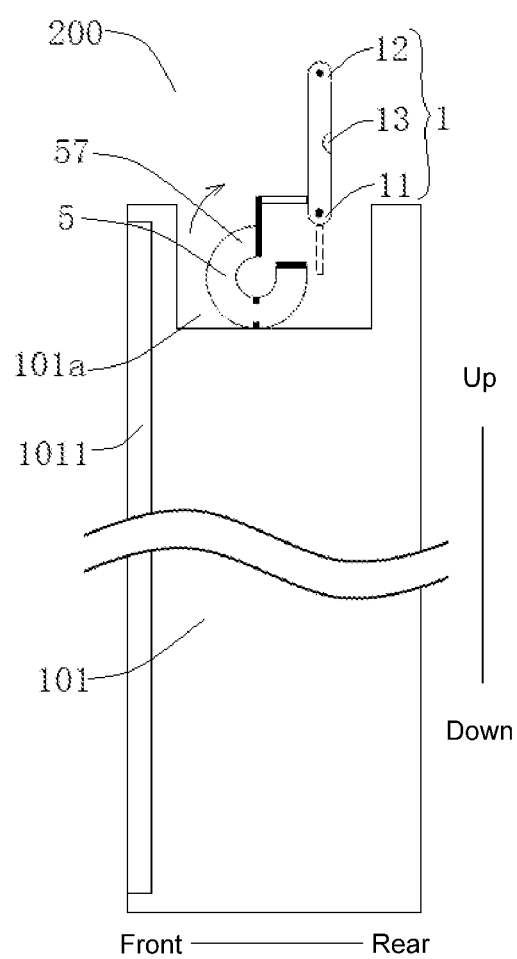
FIG. 10 is a schematic diagram after a camera in FIG. 9 turns backward.
Figure 11:
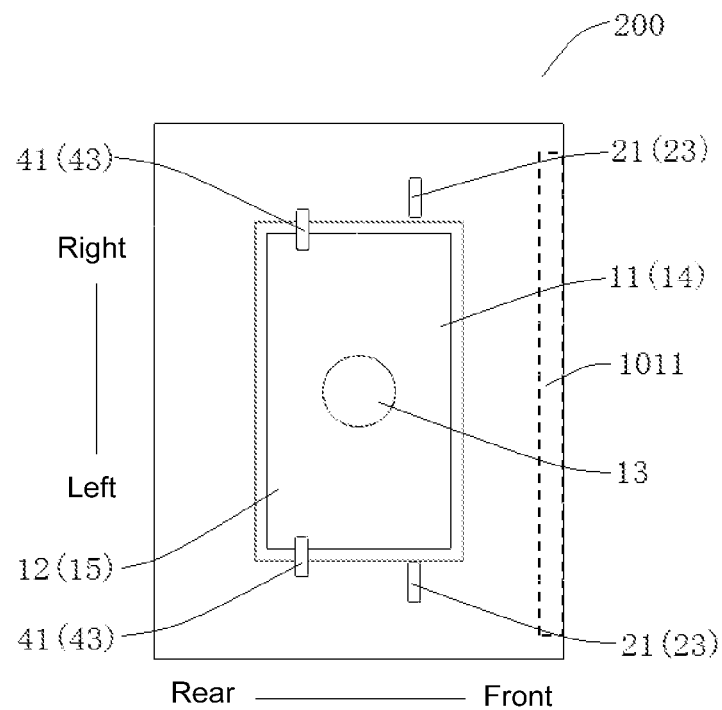
FIG. 11 is a schematic diagram before the camera in FIG. 9 turns backward.
Figure 12:
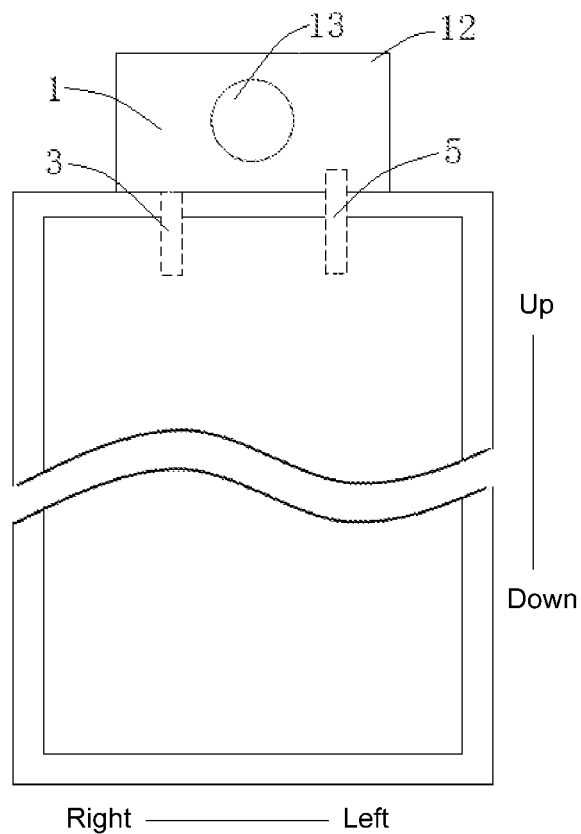
FIG. 12 is a rear view of an electronic apparatus after the camera in FIG. 10 turns backward.

In some embodiments of the present application, as shown in FIGS. 3, 9 and 10, the front driver 22 includes a drive component 221 and a reset component 222. The drive component 221 drives the front shaft 21 to move towards the position where the front shaft 21 pivotally engages with the front end portion 11, and the reset component 222 drives the front shaft 21 to move towards the position where the front shaft 21 disengages from the front end portion 11. As a result, through the cooperation between the drive component 221 and the reset component 222, it is ensured that the front driver 22 may drive the front shaft 21 to move between the position where the front shaft 21 pivotally engages with the front end portion 11 and the position where the front shaft 21 disengages from the front end portion 11.

For example, in examples shown by FIGS. 3, 9 and 10, the front shaft 21 is a permanent magnet 100a, the drive component 221 includes an electromagnet 100b, and the electromagnet 100b includes an electromagnetic coil 100c. When the electromagnetic coil 100c is powered on, the electromagnet 100b exerts an acting force on the permanent magnet 100a to push the front shaft 21 to move towards the fitting position. The reset component 222 is a spring and may be horizontally disposed, and the reset component 222 is disposed between the drive component 221 and the front shaft 21. And, one end of the reset component 222 may be connected to the drive component 221, and the other end of the reset component 222 may be connected to the front shaft 21. When the front shaft 21 moves to the fitting position, the reset component 222 may be in a stretched state, and the front shaft 21 moves to the separation position under the action of the elastic force exerted by the reset component 222.

For example, in a case where the front shaft 21 is required to move to the fitting position, the electromagnetic coil 100c may be powered on, and the electromagnet 100b exerts a pushing force on the permanent magnet 100a to push the front shaft 21 to move to the fitting position along the axis of the front shaft 21. In this process, the reset component 222 is gradually stretched, and the electromagnet 100b needs to overcome an acting force of the reset component 222 on the front shaft 21 to perform work. At last, in a case where the front shaft 21 moves to the fitting position, the reset component 222 is in the stretched state. In a case where the front shaft 21 is required to move to the separation position, the electromagnetic coil 100c may be powered off, and the front shaft 21 disengages from the front end portion 11 under the action of the elastic force exerted by the reset component 222 to move to the separation position.

Of course, in a case where the front shaft 21 is a permanent magnet 100a, the drive component 221 may be a spring, the reset component 222 includes an electromagnet 100b, and the electromagnet 100b includes an electromagnetic coil 100c. Both ends of the drive component 221 may abut against the front shaft 21 and the reset component 222 respectively. In a case where the front shaft 21 is at the separation position, the drive component 221 may be in a compression state, and in this case, the front shaft 21 may move to the fitting position under the action of the elastic force exerted by the drive component 221. In a case where the electromagnetic coil 100c is powered on, the electromagnet 100b exerts an acting force on the permanent magnet 100a, so as to pull the front shaft 21 to move towards the separation position.

For example, in a case where the front shaft 21 is required to move to the separating position, the electromagnetic coil 100c may be powered on, and the electromagnet 100b exerts a pushing force on the permanent magnet 100a to pull the front shaft 21 to move to the separation position along the axis of the front shaft 21. In this process, the reset component 222 is gradually compressed, and the electromagnet 100b needs to overcome an acting force of the reset component 222 on the front shaft 21 to perform work. At last, in a case where the front shaft 21 moves to the fitting position, the reset component 222 is in the compression state. In a case where the front shaft 21 is required to move to the fitting position, the electromagnetic coil 100c may be powered off, and the front shaft 21 is fitted with the front end portion 11 under the action of the elastic force exerted by the reset component 222 to move to the fitting position.

It will be noted that, the front shaft 21 is a permanent magnet 100a, which may be understood as including the whole front shaft 21 being formed as a permanent magnet 100a, and a portion of the front shaft 21 being formed as a permanent magnet 100a.

Of course, structures and arrangements of the front shaft 21, the drive component 221 and the reset component 222 are not limited thereto. For example, the drive component 221 and the reset component 222 may be electric motors and driving cylinders.

It will be understood that, the front driver 22 may include a housing, and both the drive component 221 and the reset component 222 may be disposed in the housing. In a case where the camera assembly 100 is applied to the electronic apparatus 200, the housing may be independent from a casing of the electronic apparatus 200 and the housing may be disposed on the casing, or the housing and the casing may be formed as an integrated member. In this case, a portion of the casing may be formed as the housing.

In some embodiments of the present application, there are two front shafts 21, the two front shafts are symmetrically disposed at two sides of the front end portion 11, and each front shaft 21 is driven by one front driver 22. For example, as shown in FIGS. 9 to 13, the two front shafts 21 may be respectively disposed at a left side and a right side of the front end portion 11, which ensures stability of the rotation of the camera module 1. There are two front drivers 22, each front driver 22 drives a corresponding front shaft 21 to move, so that motions of the two front shafts 21 are independent from each other and do not interfere with each other. As a result, in a case where one of the front shafts 21 is unable to normally move to the fitting position, the camera module 1 may still pivot around the axis of the other front shaft 21, which improves reliability of operation of the camera assembly 100. Besides, on the premise of ensuring the reliable pivoting of the camera module 1, a length of the front shaft 21 may be shortened, and thereby a fitting length between the front shaft 21 and the front end portion 11 is shortened. Therefore, it is beneficial to improving the diversity of the structure of the front shaft 21, saving occupied space of the front shaft 21, and thus improving the applicability of the camera assembly 100.

In further embodiments of the present application, as shown in FIGS. 11 to 15, the camera assembly 100 further includes a rear shaft device 4 and a backward turning drive device 5, and the rear shaft device 4 includes a rear driver 42 and a rear shaft 41. The rear shaft 41 may be disposed corresponding to the rear end portion 12 of the camera module 1, and the rear shaft 41 is adapted to pivotally engaging with the rear end portion 12, so that the camera module 1 may rotate around an axis of the rear shaft 41 in a case where the rear shaft 41 pivotally engages with the rear end portion 12. The rear driver 42 drives the rear shaft 41 to move between a position where the rear shaft 41 pivotally engages with the rear end portion 12 and a position where the rear shaft 41 disengages from the rear end portion 12. In a case where the rear shaft 41 pivotally engages with the rear end portion 12 and the front shaft 21 disengages from the front end portion 11, the backward turning drive device 5 may drive the camera module 1 to pivot backward around the rear shaft 41, so that the camera module 1 rotates to be in a rear capture state where the front end portion 11 is lifted and the lens 13 finds views backward. In a case where the front shaft 21 pivotally engages with the front end portion 11 and the rear shaft 41 disengages from the rear end portion 12, the forward turning drive device 3 may drive the camera module 1 to pivot forward around the front shaft 21, so that the camera module 1 rotates to be in the front capture state where the rear end portion 12 is lifted and the lens 13 finds views forward.

Thus, by arranging the rear shaft device 4 and the backward turning drive device 5, the rear driver 42 drives the rear shaft 41 to move between the position where the rear shaft 41 pivotally engages with the rear end portion 12 and the position where the rear shaft 41 disengages from the rear end portion 12. As a result, the camera module 1 may further rotate to be in the rear capture state on the premise that the camera module 1 can rotate to be in the front capture state, which further ensures that the camera assembly 100 has multiple view finding directions. When the camera assembly 100 is applied to the electronic apparatus 200, the camera assembly 100 may also be used as a front camera or a rear camera of the electronic apparatus 200. In this way, the costs of the electronic apparatus 200 may be further effectively reduced, it is ensured that pixels of the front camera and the rear camera of the electronic equipment 200 are consistent, and the user experience may be improved.

An axis direction of the rear shaft 41 may be parallel to the axis direction of the front shaft 21, so as to save occupied space of the camera module 1 during rotation. In a case where the camera module 1 rotates to be in the rear capture state, the lens 13 finding views backward may include the lens 13 horizontally finding views backward and the lens 13 obliquely finding views backward. The lens 13 obliquely finding views backward means that, the lens 13 faces backward and a view finding direction of the lens 13 is oblique relative to a horizontal direction.

In some embodiments of the present application, as shown in FIGS. 2 to 7 and 14 to 18, a structure of the backward turning drive device 5 is mirrored with a structure of the forward turning drive device 3, and the structure of the backward turning drive device 5 and the structure of the forward turning drive device 3 are the same. The backward turning drive device 5 and the forward turning drive device 3 may be symmetrically disposed with respect to the lens 13 in a front-rear direction, and the backward turning drive device 5 and the forward turning drive device 3 are spaced apart along a turning axis direction of the camera module 1. In a case where the camera module 1 rotates around the front shaft 21, the turning axis of the camera module is an axis of the front shaft 21. In a case where the camera module 1 rotates around the rear shaft 41, the turning axis of the camera module 1 is an axis of the rear shaft 41. For example, in a case where an axis direction of the front shaft 21 is parallel to an axis direction of the rear shaft 41, the backward turning drive device 5 and the forward turning drive device 3 may be spaced apart along the axis direction of the front shaft 21. Therefore, a design of the camera assembly 100 may be simplified, and a layout of the camera assembly 100 may be reasonable, which is conducive to the installation of the camera assembly 100.

Figure 17:
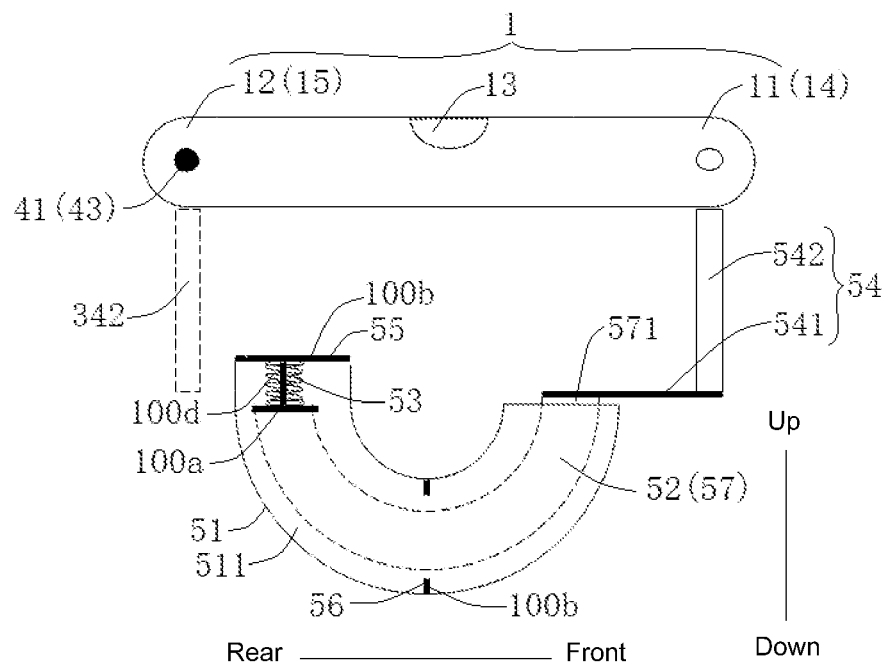
FIG. 17 is a schematic diagram showing an action of a second turning drive shown in FIG. 2.
Figure 18:
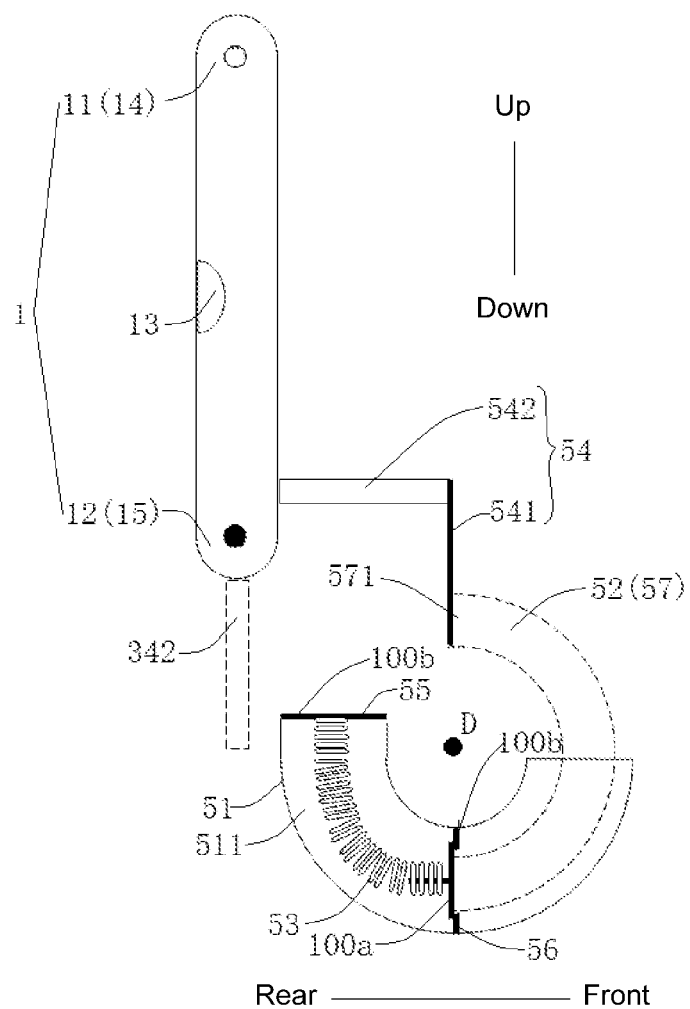
FIG. 18 is a schematic diagram showing another action of the second turning drive shown in FIG. 17.

For example, in examples shown by FIGS. 17 and 18, the backward turning drive device 5 includes a rear seat 51, a rear slider 52, a rear drive 53 and a rear pushing member 54. In a case where the camera module 1 is in the initial state, the backward turning drive device 5 may be located under the camera module 1. The rear slider 52 is in the shape of an arc and the rear slider 52 is disposed on the rear seat 51 to rotate around a center D of the arc. The rear drive 53 may be disposed on at least one of the rear seat 51 and the rear slider 52, and the rear drive 53 is used to push the rear slider 52 to rotate counterclockwise. The rear pushing member 54 is disposed at one end of the arc of the rear slider 52, that is, the rear pushing member 54 is disposed at one end of the rear slider 52 along its circumferential direction. One end of the rear pushing member 54 may cooperate with the camera module 1. In a process where the rear slider 52 rotates counterclockwise, the rear pushing member 54 may rotate counterclockwise along with the rear slider 52 to push the camera module 1 to rotate to be in the rear capture state. Therefore, the rear drive 53 drives the rear slider 52 to rotate to push the camera module 1 to rotate around the rear shaft 41, and rotation of the camera module 1 is realized, which may ensure that the camera module 1 smoothly rotates to be in the rear capture state. By arranging the rear pushing member 54, the rear slider 52 indirectly pushes the camera module 1 to rotate, and thereby the occupied space of the rear slider 52 is saved to some extent, so as to facilitate an arrangement of the rear slider 52.

Further, as shown in FIGS. 17 and 18 the backward turning drive device 5 further includes a rear reset member 55. The rear reset member 55 may be disposed on at least one of the rear seat 51 and the rear slider 52, and the rear reset member 55 is used to push the rear slider 52 to rotate clockwise, so as to realize a reset of the rear slider 52. In a case where the camera module 1 is in the rear capture state, if the slider 32 rotates clockwise, the camera module 1 rotates back to the top capture state where the front end portion 11 drops down and the lens 13 finds views upward, which further ensures the switch of the camera assembly 100 among multiple view finding directions, and improves practicability of the camera assembly 100.

It will be understood that, in a case where the camera module 1 is in the rear capture state, if the rear slider 52 rotates clockwise, the camera module 1 may be driven to the top capture state through the rear reset member 55, or may be rotated back to the top capture state through the operation of the user, which is not limited thereto.

Further, the backward turning drive device 5 further includes a rear position-limiting member 56. In a case where the camera module 1 rotates to be in the rear capture state, the rear position-limiting member 56 restricts the rear slider 52 from continuing to rotate counterclockwise. For example, as shown in FIGS. 17 and 18, the rear position-limiting member 56 may be disposed on the rear seat 51. In a case where the rear slider 52 rotates counterclockwise relative to the rear seat 51 to push the camera module 1 to rotate to be in the rear capture state, the rear slider 52 may cooperate with the rear position-limiting member 56, and the rear slider 52 cannot continue to rotate counterclockwise. The camera module 1 may be kept in the rear capture state, and the stability of the camera module 1 in the rear capture state may be guaranteed. Meanwhile, the rear position-limiting member 56 can limit a rotation angle of the rear slider 52, thereby controlling the rotation angles of the camera module 1, which further makes the camera module 1 have an appropriate angle for finding views when rotating to be in the rear capture state, thereby improving user experience.

For example, in an example shown by FIG. 17, in a case where the camera module 1 is in the initial state, the camera module 1 may be horizontally disposed, and the lens 13 finds views upward. The rear position-limiting member 56 may limit the rear slider 52 to rotate 90° counterclockwise relative to the rear seat 51, so that the camera module 1 may rotate 90° from the initial state to the rear capture state. As shown in FIG. 18, in this case, the camera module 1 may be vertically arranged and the lens 13 may horizontally find views backward, so as to better match the user's use habits. Of course, in a case where the camera module 1 is in the initial state, the camera module 1 may be arranged non-horizontally; and in a case where the camera module 1 rotates to be in the rear capture state, the camera module 1 may be arranged non-vertically.

The rear position-limiting member 56 at least restricting the rear slider 52 from continuing to rotate counterclockwise may include that the rear position-limiting member 56 is only used to restrict the rear slider 52 from continuing to rotate counterclockwise, and may also include that the rear position-limiting member 56 is not only used to restrict the rear slider 52 from continuing to rotate counterclockwise, but also, for example, has a function of pushing the rear slider 52 to rotate clockwise, that is, the rear position-limiting member 56 further has a function of resetting the rear slider 52.

For example, in examples shown by FIGS. 17 and 18, the rear seat 51 defines a rear arc-shaped slideway 511, and at least one end of the rear arc-shaped slideway 511 in a circumferential direction may be open. The rear slider 52 is slidably arranged in the rear arc-shaped slideway 511, and a curvature of the arc corresponding to the rear slider 52 may be the same as a curvature of the rear arc-shaped slideway 511, so that the rear arc-shaped slideway 511 has a certain position-limiting effect on the rear slider 52 to ensure that the rear slider 52 rotates around the center D. In a process where the rear slider 52 slides relative to the rear arc-shaped slideway 511, the rear drive 53 may push the rear slider 52 to slide out upward from a front end of the rear arc-shaped slideway 511. As a result, a portion of the rear slider 52 is fitted with the rear arc-shaped slideway 511, and another portion extends out of the rear arc-shaped slideway 511 to drive the camera module 1 to rotate.

It will be understood that, one of a guide groove and a guide protrusion may be formed in a wall surface of the rear arc-shaped slideway 511, and the other one of the guide groove and the guide protrusion may be formed in an outer wall of the rear slider 52. The guide groove extends along an extending direction of the rear arc-shaped slideway 511, and the guide protrusion cooperates with the guide groove and slides along the guide groove, which further ensures that the rear slider 52 may slide relative to the rear arc-shaped slideway 511, Besides, to a certain extent, due to position-limiting effect of the guide groove and the guide protrusion, it is possible to properly reduce the matching accuracy between the rear arc-shaped slideway 511 and the rear slider 52 on the premise that the rear slider 52 is prevented from shaking during a sliding process, which facilitates installation of the rear slider 52 and the rear seat 51. Of course, the rear arc-shaped slideway 511 and the rear slider 52 may not be provided with a guide groove and a guide protrusion.

In a case where the backward turning drive device 5 includes the rear reset member 55, the rear reset member 55 may pull the rear slider 52 downward back into the rear arc-shaped slideway 511 in a process where the rear slider 52 slides relative to the rear arc-shaped slideway 511. In a case where the backward turning drive device 5 includes the rear position-limiting member 56, the rear position-limiting member 56 may be disposed on the wall surface of the rear arc-shaped slideway 511, so as to restrict the rear slider 52 from continuing to rotate counterclockwise.

For example, in examples shown by FIGS. 17 to 18, the rear arc-shaped slideway 511 extends along the arc shape thereof first downward and then upward in a direction from the rear to the front. The rear reset member 55 is disposed at a rear end of the rear arc-shaped slideway 511, and the rear position-limiting member 56 is disposed at the middle of the rear arc-shaped slideway 511. A permanent magnet 100*a* is disposed at a rear end of the rear slider 52, and the permanent magnet 100*a* slides between the rear reset member 55 and the rear position-limiting member 56. The rear reset member 55 is an electromagnet 100*b*, and the electromagnet 100*b* is used to push the rear slider 52 to rotate clockwise. The rear position-limiting member 56 is an electromagnet 100*b*, and at least restricts the rear slider 52 from continuing to rotate counterclockwise when the camera module 1 rotates to be in the rear capture state. The rear drive 53 is a spring connected between the rear reset member 55 and the rear end of the rear slider 52.

For example, in a case where the camera module 1 is in the initial state, most portion of the rear slider 52 is fitted in the rear arc-shaped slideway 511, so that the permanent magnet 100*a* at the rear end of the rear slider 52 is disposed close to the rear reset member 55. In this case, the rear drive 53 may be in a compression state. In a case where the camera module 1 is required to rotate to be in the rear capture state, the rear reset member may be powered off, and the rear slider rotates counterclockwise under the action of an elastic force of the rear drive. In a case where the permanent magnet 100*a* at the rear end of the rear slider 52 rotates to the middle of the rear arc-shaped slideway 511 or to be close to the middle of the rear arc-shaped slideway 511, the rear position-limiting member 56 is powered on, and the rear position-limiting member 56 exerts an attractive force on the permanent magnet 100*a*, so as to attract the permanent magnet 100*a* and restrict the rear slider 52 from continuing to rotate counterclockwise. In this case, the camera module 1 is kept in the rear capture state. In a case where the camera module 1 is required to switch from the rear capture state to the initial state, the rear position-limiting member 56 is powered off and the rear reset member 55 is powered on. The rear reset member 55 may exert an attractive force on the permanent magnet 100*a* to make the rear slider 52 rotate clockwise. In this process, the rear slider 52 needs to overcome the elastic force of the rear drive 53 to perform work.

Of course, the rear drive 53, the rear position-limiting member 56 and the rear reset member 55 may further be formed into other structures, which is not limited thereto.

For example, the rear drive 53 may include the electromagnet 100*b* at the rear end of the rear arc-shaped slideway 511 and the spring between the rear seat 51 and the rear slider 52, and both the rear position-limiting member 56 and the rear reset member 55 may be the electromagnet 100*b* at the middle of the rear arc-shaped slideway 511. In a case where the camera module 1 is in the initial state, the spring may be in a compression state, and the electromagnet 100*b* at the rear end of the rear arc-shaped slideway 511 is powered on and exerts a pushing force on the permanent magnet 100*a* at the rear end of the rear slider 52 to make the rear slider 52 rotate counterclockwise under the action of the pushing force and the elastic force of the spring. In a case where the permanent magnet 100*a* at the rear end of the rear slider 52 rotates to the middle of the rear arc-shaped slideway 511 or to be close to the middle of the rear arc-shaped slideway 511, the rear position-limiting member 56 is powered on, and the rear position-limiting member 56 exerts the attractive force on the permanent magnet 100*a* to attract the permanent magnet 100*a* and restrict the rear slider 52 from continuing to rotate counterclockwise. In this case, the camera module 1 is kept in the rear capture state. In a case where the camera module 1 is required to switch from the rear capture state to the initial state, the rear position-limiting member 56 is powered on and the current in the rear position-limiting member 56 has a reversed direction. The rear position-limiting member 56 may exert a repulsive force on the permanent magnet 100*a* to make the rear slider 52 rotate clockwise. In this process, the rear slider 52 needs to overcome the elastic force of the spring to perform work.

For another example, the rear drive 53 is an electromagnet 100*b* at the rear end of the rear arc-shaped slideway 511, the rear reset member 55 is a spring between the rear seat 51 and the rear slider 52, and the rear position-limiting member 56 is an electromagnet 100*b* at the middle of the rear arc-shaped slideway 511. In a case where the camera module 1 is in the initial state, the rear drive 53 is powered on and exerts the pushing force on the permanent magnet 100*a* at the rear end of the rear slider 52 to make the rear slider 52 rotate counterclockwise under the action of the pushing force. In a case where the permanent magnet 100*a* at the rear end of the rear slider 52 rotates to the middle of the rear arc-shaped slideway 511 or to be close to the middle of the rear arc-shaped slideway 511, the rear position-limiting member 56 is powered on, and the rear position-limiting member 56 exerts an attractive force on the permanent magnet 100*a* to attract the permanent magnet 100*a* and restrict the rear slider 52 from continuing to rotate counterclockwise. In this case, the camera module 1 is kept in the rear capture state, and the rear reset member 55 is in a stretched state. In a case where the camera module 1 is required to switch from the rear capture state to the initial state, the rear position-limiting member 56 is powered off and the rear drive 53 is powered off. The rear reset member 55 may exert a pulling force on the rear slider 52 to make the rear slider 52 rotate clockwise.

It will be understood that, applications of the electromagnet 100*b* are not limited thereto, and the electromagnet 100*b* is not limited to only one state when the electromagnet 100*b* is powered on during usage. That is, a direction of the current in the electromagnet 100*b* may change to assist a motion of the rear slider.

For example, as shown in FIGS. 17 and 18, the rear pushing member 54 is disposed outside the rear arc-shaped slideway 511, and the rear pushing member 54 includes a third extending section 541 and a fourth extending section 542. The third extending section 541 extends outward from a front end of the rear slider 52 along a radial direction of the rear slider 52, and the fourth extending section 542 starts from a tail end of the third extending section 541 along an extending direction thereof and extends along a direction perpendicular to the third extending section 541 towards a direction away from the rear slider 52. A tail end of the fourth extending section 542 along an extending direction thereof may cooperate with the camera module 1 to push the camera module 1 to rotate, and both the third extending section 541 and the fourth extending section 542 may extend along a straight line, so that the rear pushing member 54 is substantially formed in an L-shaped structure. As a result, a structure of the rear pushing member 54 is simplified, the occupied space of the rear seat 51 and the rear slider 52 is further reduced, and interference between the camera module 1 and the rear seat 51 during the rotation of the camera module 1 is avoided.

It will be noted that, a direction "outside" may refer to a direction away from the center D of the arc.

Of course, the structure of the backward turning drive device 5 and the structure of the forward turning drive device 3 may be different, as long as the backward turning drive device 5 may drive the camera module 1 to pivot backward around the rear shaft 41.

In some embodiments, a structure of the rear driver 42 and a structure of the front driver 22 are the same, which simplifies the design of the camera assembly 100, reduces the design cost of the camera assembly 100, and facilitates the processing of the camera assembly 100.

For example, the rear driver 42 may include a rear drive component 421 and a rear reset component 422. The rear drive component 421 drives the rear shaft 41 to move towards the position where the rear shaft 41 pivotally engages with the rear end portion 12, and the rear reset component 422 drives the rear shaft 41 to move towards the position where the rear shaft 41 disengages from the rear end portion 12. As a result, through the cooperation between the rear drive component 421 and the rear reset component 422, it is ensured that the rear driver 42 may drive the rear shaft 41 to move between the position where the rear shaft 41 pivotally engages with the rear end portion 12 and the position where the rear shaft 41 disengages from the rear end portion 12.

Figure 19:
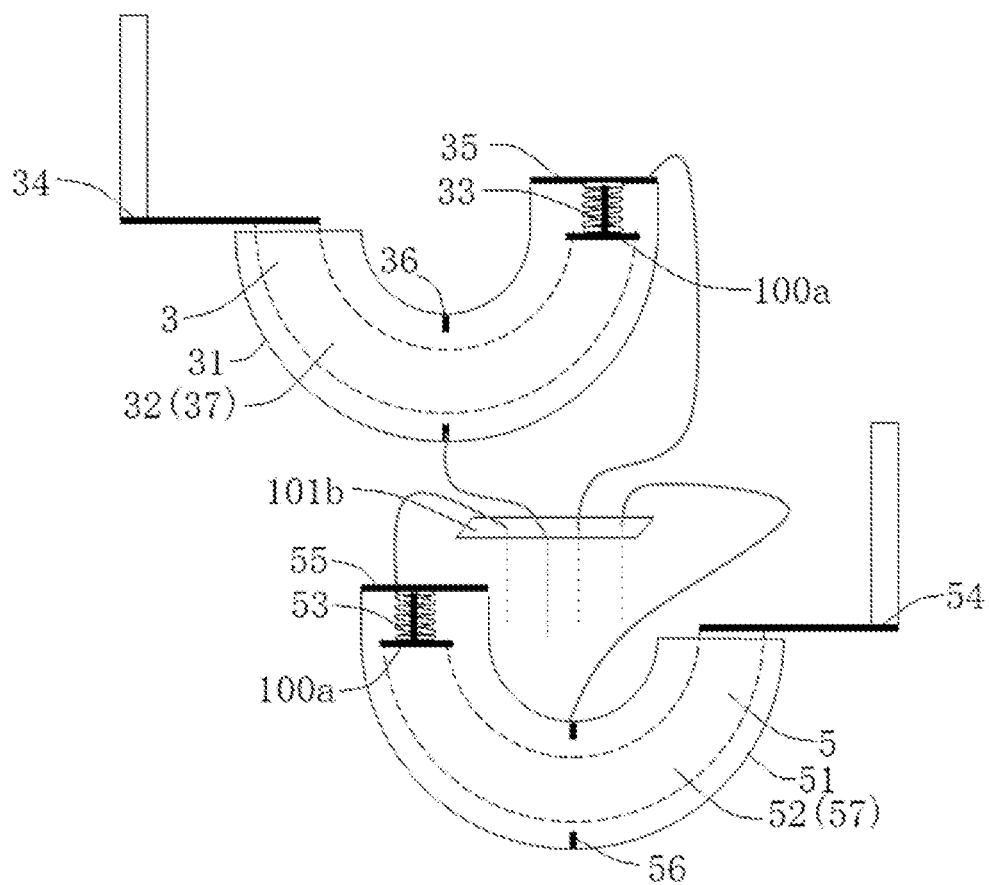
FIG. 19 is a schematic diagram showing wiring of the electronic apparatus shown in FIG. 2.
Figure 20:
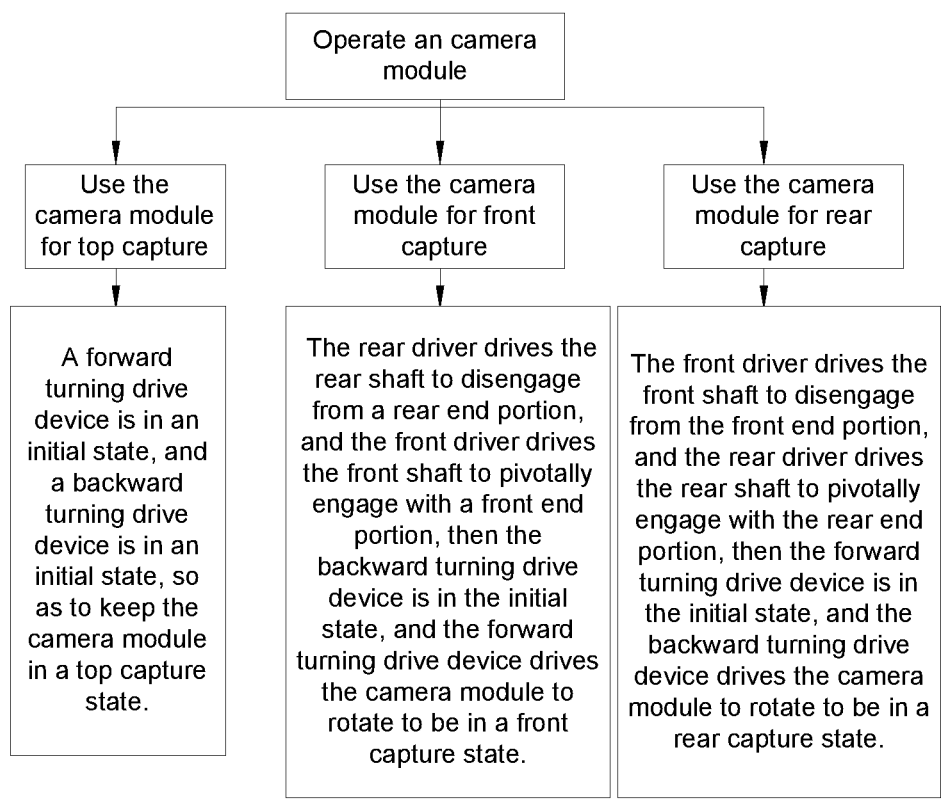
FIG. 20 is a schematic flow diagram of a control method of an electronic apparatus, according to an embodiment of the present application.

In examples shown by FIGS. 19 and 20, the rear shaft 41 is a permanent magnet 100a, the rear drive component 421 includes an electromagnet 100b, and the electromagnet 100b includes an electromagnetic coil 100c. When the electromagnetic coil 100c is powered on, the electromagnet 100b exerts an acting force on the permanent magnet 100a to push the rear shaft 41 to move towards the fitting position. The rear reset component 422 is a spring and may be horizontally disposed, and the rear reset component 422 is connected between the rear drive component 421 and the rear shaft 41. And, one end of the rear reset component 422 may be connected to the rear drive component 421, and the other end of the rear reset component 422 may be connected to the rear shaft 41. When the rear shaft 41 moves to the fitting position, the rear reset component 422 may be in a stretched state, and the rear shaft 41 moves to the separation position under the action of an elastic force exerted by the rear reset component 422.

Of course, the structure of the rear driver 42 and the structure of the front driver 22 may be different, as long as it can ensure that the rear driver 42 may drive the rear shaft 41 to move between the position where the rear shaft 41 pivotally engages with the rear end portion 12 and the position where the rear shaft 41 disengages from the rear end portion 12.

According to embodiments of a second aspect of the present application, a control method of a camera assembly 100 is provided, and the camera assembly 100 is a camera assembly 100 according to some embodiments of the present application described above.

The control method includes the following steps: when the camera module 1 is used for top capture, the forward turning drive device 3 is in the initial state, and the backward turning drive device 5 is in the initial state, so as to keep the camera module 1 in the top capture state where the lens 13 finds views upward, and in this case, the front shaft 21 and the rear shaft 41 may cooperate with the camera module 1 to ensure the stability of the camera module 1; when the camera module 1 is used for front capture, the rear driver 42 drives the rear shaft 41 to disengage from the rear end portion 12, and the front driver 22 drives the front shaft 21 to pivotally engage with the front end portion 11, the backward turning drive device 5 is in the initial state, and the forward turning drive device 3 drives the camera module 1 to rotate to be in the front capture state; and when the camera module 1 is used for rear capture, the front driver 22 drives the front shaft 21 to disengage from the front end portion 11, and the rear driver 42 drives the rear shaft 41 to pivotally engage with the rear end portion 12, the forward turning drive device 3 is in the initial state, and the backward turning drive device 5 drives the camera module 1 to rotate to be in the rear capture state.

It will be understood that, when the camera module 1 is switched between the front capture state and the rear capture state, it can be switched indirectly through the top capture state. That is, if the camera module 1 is switched from the front capture state to the rear capture state, the camera module 1 may be switched to the top capture state first, and then to the rear capture state, or if the camera module 1 is switched from the rear capture state to the front capture state, the camera module 1 may be switched to the top capture state first, and then to the front capture state.

The control method of the camera assembly 100 according to the embodiments of the present application is simple in logic, and easy to implement, and allows the camera module 1 to have functions of top capture, front capture and rear capture, which enriches the capture functions of the camera assembly 100, reduces the costs of the camera assembly 100, and realizes consistency of camera pixels in multiple view finding directions.

An electronic apparatus 200 according to embodiments of a third aspect of the present application includes an apparatus body 101 and a camera assembly 100. The camera assembly 100 is a camera assembly 100 according to the embodiments of the first aspect of the present application, and the camera assembly 100 is disposed on the apparatus body 101. The electronic apparatus 200 may be a cellphone, an iPad, a display, etc.

The electronic apparatus 200 according to the embodiments of the present application allows the electronic apparatus 200 to have a plurality of capture angles by adopting the camera assembly 100 described above, which enriches the capture functions of the electronic apparatus 200, reduces costs, facilitates the realization of the full screen display of the electronic apparatus 200, and improves user experience.

For example, as shown in FIGS. 1 to 3 and 14, a top wall of the apparatus body 101 is formed with a groove 101a that is recessed from the top to the bottom. Only a top of the groove 101a is open, that is, the groove 101a may have a front side wall, a rear side wall, a left side wall, a right side wall, and a bottom wall. The camera module 1 is embedded in the groove 101a. In a case where the camera module 1 is in the top capture state where the lens 13 finds views upward, a top face of the camera module 1 is flush with the top wall of the apparatus body 101, which allows the electronic apparatus 200 to have a regular and beautiful appearance and a good hand feeling, and avoids a damage to the camera module 1 (if the camera module 1 protrudes from the apparatus body 101, the electronic device 100 will easily collide with the camera module 1 when it is dropped, resulting in damage to the camera module 1), so that the camera module 1 is protected. In this case, the electronic apparatus 200 may realize a function of top capture, and the capture functions of the electronic apparatus 200 may be enriched. In a case where the camera module 1 rotates to be in the front capture state, the rear end portion 12 of the camera module 1 rotates above the groove 101a and the lens 13 is higher than the groove 101a, which prevents the front side wall of the groove 101a from blocking the lens, and ensures normal view finding and capture of the lens 13, and realizes the view finding of the camera module 1 in multiple angles. In addition, this may avoid providing a view finding opening corresponding to the lens 13 on the display screen of the electronic apparatus 200, which is beneficial to improving a screen-to-body ratio of the electronic apparatus 200, and facilitates realization of the full screen display of the electronic apparatus 200.

It will be understood that, in a case where the camera module 1 has the rear capture state, if the camera module 1 rotates to the rear capture state, the front end portion 11 of the camera module 1 rotates above the groove 101a and the lens 13 is higher than the groove 101a, which prevents the rear side wall of the groove 101a from blocking the lens, and ensures normal view finding and capture of the lens 13. In addition, through the camera assembly 100, it is possible to realize functions of the front capture and the rear capture of the electronic apparatus 200, which improves experience of using the electronic apparatus 200.

Other constitutions and operations of the electronic apparatus 200 according to the embodiments of the present application are known for a person of ordinary skill in the art, which will not be described in detail herein.

Some implementations provided by the embodiments of the present application are described below, and the electronic apparatuses 200 according to the embodiments of the present application are described with reference to the accompanying drawings.

Figure 2:
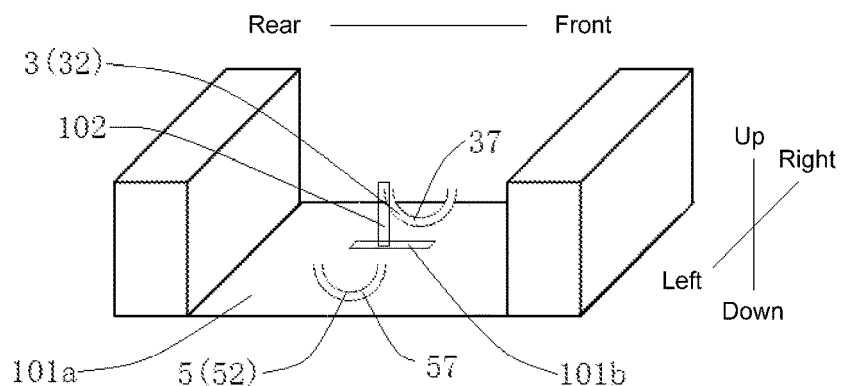
FIG. 2 is a schematic diagram showing a partial structure of the electronic apparatus shown in FIG. 1.

As shown in FIGS. 1, 2 and 7, the electronic apparatus 200 includes the apparatus body 101, a camera 10, a first shaft 23, a first driver 24, a second shaft 43, a second driver 44, a first turning drive 37, and a second turning drive 57.

The apparatus body 101 includes a display screen 1011, the display screen 1011 has a square structure, and the display screen 1011 has a light exit side, an opposite side and four outer peripheral sides. The display screen 1011 includes four outer edges 1011a, and the outer edges 1011a are correspondingly located at the outer peripheral sides of the display screen 1011 respectively. The apparatus body 101 is provided with a groove 101a, the groove 101a is located at the opposite side of the display screen 1011, and the groove 101a is located at an outer peripheral side of the display screen 1011.

For example, as shown in FIGS. 1 and 2, a front side of the display screen 1011 is the light exit side of the display screen 1011, and a rear side of the display screen 1011 is the opposite side of the display screen 1011. An upper side, a lower side, a left side and a right side of the display screen 1011 are the four outer peripheral sides of the display screen 1011. The display screen 1011 includes the four outer edges 1011a, and the four outer edges 1011a are a top edge, a bottom edge, a left edge and a right edge, respectively. The top edge is located at the upper side of the display screen 1011, the bottom edge is located at the lower side of the display screen 1011, the left edge is located at the left side of the display screen 1011 and the right edge is located at the right side of the display screen 1011. The groove 101a is located at the rear side of the display screen 1011, and the groove 101a is located at one of the four outer peripheral sides of the display screen 1011. A side of the groove 101a away from a center of the apparatus body 101 is open. For example, only a side of the groove 101a away from the center of the apparatus body 101 is open. For example, in a case where the groove 101a is formed at the top of the apparatus body 101, the groove 101a is located at the upper side of the display screen 1011, and only the top side of the groove 101a is open; and in a case where the groove 101a is formed at a left side of the apparatus body 101, the groove 101a is located at the left side of the display screen 1011, and only the left side of the groove 101a is open; which is not limited thereto.

The camera 10 is disposed in the groove 101a, and the camera 10 is formed as a strip-shaped structure 10a that extends along a first direction. The strip-shaped structure 10a includes a first end 14, a second end 15, and a lens 13. The first end 14, the lens 13, and the second end 15 are sequentially disposed along a second direction. The first direction is parallel to an extending direction of a plane where the outer edges 1011a of the display screen 1011 are located, and the second direction is a direction from the light exit side of the display screen 1011 to the opposite side of the display screen 1011, and the second direction is perpendicular to the first direction.

For example, in an example shown by FIG. 1, the camera 10 is embedded in the groove 101a to ensure a regular appearance of the electronic apparatus 200. The first direction is a left-right direction, and the second direction is a front-to-rear direction. The strip-shaped structure 10a may extend along the left-right direction, and the first end 14, the lens 13 and the second end 15 are sequentially arranged along the front-to-rear direction. Of course, the first direction may also be an up-down direction.

The first shaft 23 is disposed between the first end 14 and the first driver 24, and the first shaft 23 is used for pivotally engaging with the first end 14. The first driver 24 is disposed in the groove 101a, and the first driver 24 is connected to the first shaft 23. The first driver 24 is configured to drive the first shaft 23 to pivotally engage with the first end 14 or drive the first shaft 23 to disengage from the first end 14. Then the first driver 24 is configured to drive the first shaft 23 to move between a position where the first shaft 23 pivotally engages with the first end 14 and a position where the first shaft 23 disengages from the first end 14. In a case where the first shaft 23 pivotally engages with the first end 14, the camera 10 may rotate around an axis of the first shaft 23, and in a case where the first shaft 23 disengages from the first end 14, the first shaft 23 may be completely separated from the camera 10.

The second shaft 43 is disposed between the second end 15 and the second driver 44, and the second shaft 43 is used for pivotally engaging with the second end 15. The second driver 44 is disposed in the groove 101a, the second driver 44 is connected to the second shaft 43, and the second driver 44 is configured to drive the second shaft 43 to pivotally engage with the second end 15 or drive the second shaft 43 to disengage from the second end 15. Then the second driver 44 is configured to drive the second shaft 43 to move between a position where the second shaft 43 pivotally engages with the second end 15 and a position where the second shaft 43 disengages from the second end 15. In a case where the second shaft 43 pivotally engages with the second end 15, the camera 10 may rotate around an axis of the second shaft 43, and in a case where the second shaft 43 disengages from the second end 15, the second shaft 43 may be completely separated from the camera 10.

The first turning drive 37 is formed in a strip-shaped arc structure, and the first turning drive 37 rotates around a center of the arc curve of the first turning drive 37. One end of the first turning drive 37 in a circumferential direction is formed as a first drive end 371, and the first drive end 371 cooperates with the second end 15, so that the first turning drive 37 drives the camera 10 to turn to be in a first capture state around the first shafts 23. In the first capture state, the second end 15 is lifted and the lens 13 finds views towards the light exit side of the display screen 1011.

The second turning drive 57 is formed in a strip-shaped arc structure, and the second turning drive 57 rotates around a center of the arc curve of the second turning drive 57. One end of the second turning drive 57 in a circumferential direction is formed as a second drive end 571, and the second drive end 571 cooperates with the first end 14, so that the second turning drive 57 drives the camera 10 to turn to be in a second capture state around the second shaft 43. In the second capture state, the first end 14 is lifted and the lens 13 finds views towards the opposite side of the display screen 1011.

For example, in examples shown by FIGS. 3 to 7 and 9 to 11, in a case where the second driver 44 drives the second shaft 43 to disengage from the second end 15 and the first driver 24 drives the first shaft 23 to pivotally engage with the first end 14, the second turning drive 57 may not act. For example, the second turning drive 57 is in an initial state, and the first turning drive 37 rotates in a positive direction (e.g., the first turning drive 37 rotates clockwise in FIG. 6), so as to drive the camera 10 to rotate to be in the first capture state. In this case, the second end 15 is lifted away from the center of the apparatus body 101 and the lens 13 finds views forward to realize the front capture of the electronic apparatus 200. In a case where the first driver 24 drives the first shaft 23 to disengage from the first end 14 and the second driver 44 drives the second shaft 43 to pivotally engage with the second end 15, the first turning drive 37 may not act. For example, the first turning drive 37 is in an initial state, and the second turning drive 57 rotates in a reverse direction (e.g., the second turning drive 57 rotates clockwise in FIG. 10), so as to drive the camera 10 to rotate to be in the second capture state. In this case, the first end 14 is lifted away from the center of the apparatus body 101 and the lens 13 finds views backward to realize the rear capture of the electronic apparatus 200. Besides, by controlling motions of the first driver 24, the second driver 44, the first turning drive 37 and the second turning drive 57, a switch between the first capture state and the second capture state of the electronic apparatus 200 may be realized.

Therefore, the camera 10 may rotate around the first shaft 23 from the initial state to the first capture state or rotate around the second shaft 43 from the initial state to the second capture state, which allows the electronic apparatus 200 to have multiple view finding directions (or capture directions), and a switch of multiple view finding directions is realized, and effect of pictures taken at multiple capture angles is consistent, thereby improving user experience. The electronic apparatus 200 may be switched to an appropriate capture state according to the user's requirements, and there is no need to provide lens(es) at different view finding directions, which reduces costs of the electronic apparatus 200.

It will be understood that, in a case where the first capture state is a front capture state of the camera 10 and the second capture state is a rear capture state of the camera 10, the camera 10 may be used as the front camera of the electronic apparatus 200, and may also be used as the rear camera of the electronic apparatus 200. In a case where the camera 10 is in the front capture state, both the second end 15 and the lens 13 are lifted away from the center of the apparatus body 101 so that the second end 15 and the lens 13 rotate outside the groove 101a, and the lens 13 finds views forward. Therefore, there is no need to provide a view finding opening corresponding to the lens 13 in the display screen 1011, which is beneficial to improving the screen-to-body ratio of the electronic apparatus 200 and facilitates the realization of the full screen display of the electronic apparatus 200. In a case where the camera 10 is in the rear capture state, both the first end 14 and the lens 13 are lifted away from the center of the apparatus body 101, so that the first end 14 and the lens 13 rotate outside the groove 101a, and the lens 13 finds views backward.

In a case where the camera 10 is in the initial state, the lens 13 may find views towards the outer peripheral side of the display screen 1011. For example, in a case where the groove 101a is located at the upper side of the display screen 101, the initial state of the camera 10 is the top capture state of the camera 10, and the camera 10 is in the initial state, the lens 13 finds views upward.

It will be noted that, in a case where the camera 10 rotates to be in the front capture state, the lens 13 finding views forward may include the lens 13 horizontally finding views forward and the lens 13 obliquely finding views forward. The lens 13 obliquely finding views forward means that, the lens 13 faces forward and the view finding direction of the lens 13 is oblique relative to the horizontal direction. In a case where the camera 10 rotates to the rear capture state, the lens 13 finding views backward may include the lens 13 horizontally finding views backward and the lens 13 obliquely finding views backward. The lens 13 obliquely finding views backward means that, the lens 13 faces backward and the view finding direction of the lens 13 is oblique relative to the horizontal direction.

The electronic apparatus 200 according to the embodiments of the present application has rich camera functions and low costs, and is convenient for realizing the full screen display of the electronic apparatus 200.

For example, the camera 10 may be formed as the camera module 1 describe above, the first shaft 23 may be formed as the front shaft 21 describe above, the first driver 24 may be formed as the front driver 22 described above, the second shaft 43 may be formed as the rear shaft 41 described above, the second driver 44 may be formed as the rear driver 42 described above, the first turning drive 37 may be formed as the slider 32 described above, and the second turning drive 57 may be formed as the rear slider 52 described above.

Figure 14:
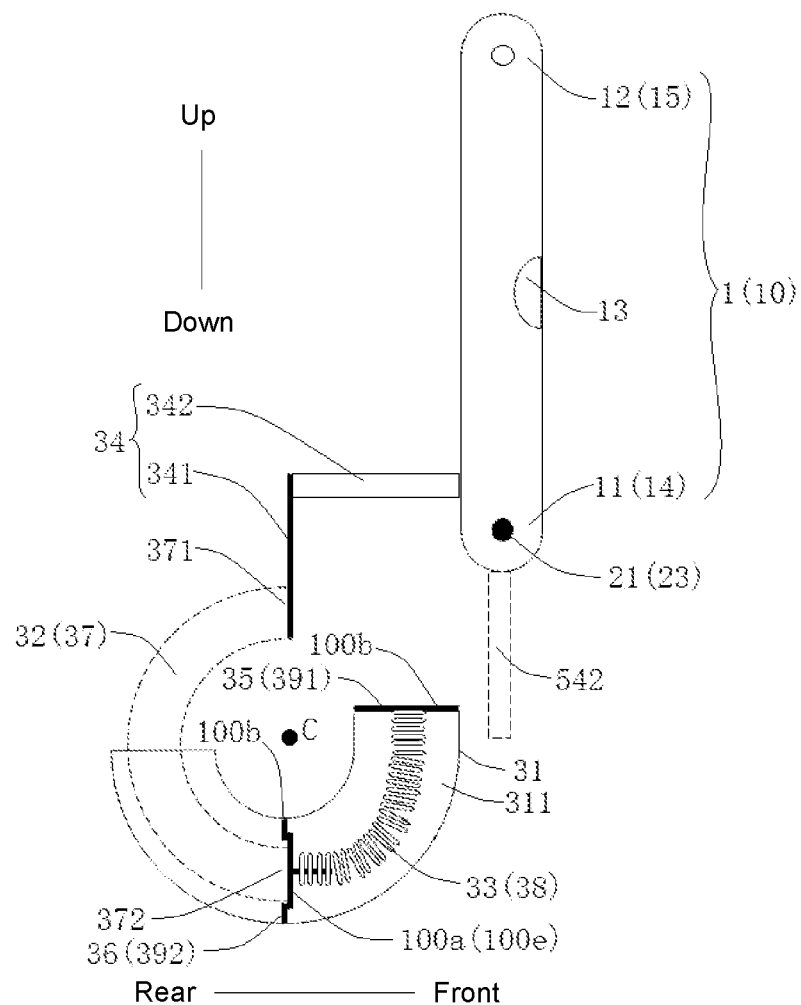
FIG. 14 is a schematic diagram showing another action of the first turning drive shown in FIG. 13.

In some embodiments, an outer side of the first turning drive 37 is provided with a seat 31 that is in the shape of an arc, the first turning drive 37 rotates around the center of the arc curve of the first turning drive 37 relative to the seat 31 and then the seat 31 may have a certain guiding effect on a motion of the first turning drive 37. For example, as shown in FIGS. 13 and 14, the seat 31 may define the arc-shaped slideway 311, and one end of the arc-shaped slideway 311 in a circumferential direction is open. The first turning drive 37 is arranged in the arc-shaped slideway 311, and a curvature of the arc curve of the arc-shaped slideway 311 is the same as a curvature of the arc curve of the first turning drive 37. In a process where the first turning drive 37 slides relative to the arc-shaped slideway 311 the first turning drive 37 slides out from the end of the arc-shaped slideway 311 in the circumferential direction, so that the first drive end 371 drives the camera 10 to rotate around the first shaft 23.

The other end of the first turning drive 37 in the circumferential direction is formed as a first free end 372, and an elastic member 38 is disposed between the first free end 372 and a corresponding end of the seat 31 in the circumferential direction. The first drive end 371 is provided with the pushing member 34, and the pushing member 34 abuts against the second end 15. The elastic member 38 is used for pushing the first turning drive 37 to rotate in a positive direction, so as to drive the pushing member 34 to push the camera 10 to rotate to be in the first capture state. For example, in examples shown by FIGS. 13 and 14, the elastic member 38 is a spring. The spring is connected between the first free end 372 and the corresponding end of the seat 31 in the circumferential direction, the spring is in a compression state, and the spring exerts a pushing force on the first turning drive 37 to make the first turning drive 37 rotate around the first shaft 23. In the process where the first turning drive 37 rotates in the positive direction, the first drive end 371 drives the pushing member 34 to rotate in the positive direction to push the camera 10 to rotate to be in the first capture state.

Therefore, by arranging that the elastic member 38 drives the first turning drive 37 to rotate around the first shaft 23, it is conducive to ensuring that the camera 10 smoothly rotates to be in the front capture state; and by arranging the pushing member, the first turning drive 37 indirectly pushes the camera 10 to rotate, which saves occupied space of the arc-shaped first turning drive 37, and facilitates an arrangement of the first turning drive 37.

The drive 33 described above may be formed as the elastic member 38. It should be noted that, "positive direction" and "reverse direction" are relative concepts and are merely to facilitate the description, and are not to indicate or imply that the first turning drive 37 must have a specific rotation direction. Therefore, they should not be construed as limitations to the present application.

In some embodiments, as shown in FIGS. 13 and 14, the first free end 372 is provided with a magnet 100e, and the end of the seat 31 in the circumferential direction corresponding to the first free end 372 is provided with a first electromagnet 391. The first electromagnet 391 cooperates with the magnet 100e to push the first turning drive 37 to rotate in the reverse direction (for example, the first turning drive 37 rotates counterclockwise in FIG. 14). As a result, the camera 10 rotates from the first capture state back to a third capture state, and in the third capture state, the second end 15 drops down to be aligned with the first end 14, and the lens 13 finds views towards the outer peripheral side of the display screen 1011, thereby realizing a reset of the first turning drive 37, further ensuring that the switch of the electronic apparatus 200 among multiple view finding directions, and improving practicability of the electronic apparatus 200.

For example, in examples shown by FIGS. 13 and 14, the magnet 100e at the first free end 372 and the first electromagnet 391 are spaced apart. When powered on, the first electromagnet 391 may exert a magnetic attractive force on the magnet 100e. The magnetic attractive force makes the first turning drive 37 rotate in the reverse direction, so as to realize the reset of the first turning drive 37 and a switch among capture states of the camera 10. Of course, cooperation manners between the first electromagnet 391 and the magnet 100e are not limited thereto.

It will be understood that, in a case where the camera 10 is in the first capture state, if the camera 10 is required to switch to the third capture state, the switch may be realized through cooperation between the first electromagnet 391 and the magnet 100e, and may also be realized through operation of the user, which is not limited thereto. The magnet 100e may be formed as the permanent magnet 100a described above, and the reset member 35 described above may be formed as the first electromagnet 391.

In some embodiments, a second electromagnet 392 is disposed in the seat 31. The second electromagnet 392 is disposed at the middle of the seat 31 in the circumferential direction, and the second electromagnet 392 cooperates with the magnet 100e to at least limit a positive rotation angle of the first turning drive 37, so as to stably keep the camera 10 in the first capture state.

For example, in examples shown by FIGS. 13 and 14, in a process where the elastic member 38 drives the first turning drive 37 to rotate in the positive direction, the magnet 100e gradually approaches to the second electromagnet 392. When powered on, the second electromagnet 392 may exert a magnetic attractive force on the magnet 100e, so as to have position-limiting effect on the magnet 100e. As a result, the first turning drive 37 cannot continue to rotate in the positive direction, which ensures that the camera 10 is kept in the first capture state stably. Meanwhile, a limitation on the rotation angle of the first turning drive 37 may be realized through cooperation between the second electromagnet 392 and the magnet 100e. For example, the first turning drive 37 rotates 90° in the positive direction, the camera 10 may be switched to the first capture state, so that the camera 10 has an appropriate angle for finding views in the first capture state. Of course, cooperation manners of the second electromagnet 392 and the magnet 100e are not limited thereto.

In addition, in a case where the camera 10 is in the first capture state, if the second electromagnet 392 receives a current having a reverse direction, the second electromagnet 392 may exert a repulsive force on the magnet 100e to realize the reset of the first turning drive 37, The position-limiting member 36 described above may be formed as the second electromagnet 392.

In some embodiments, as shown in FIGS. 13 and 14, the pushing member 34 is disposed outside the seat 31, and the pushing member 34 includes the first extending section 341 and the second extending section 342. The first extending section 341 extends outward from the first drive end 371 along a radial direction of the first turning drive 37, and the second extending section 342 starts from a tail end of the first extending section 341 along an extending direction thereof and extends along the direction perpendicular to the first extending section 341 towards a direction away from the first turning drive 37. The tail end of the second extending section 342 along an extending direction thereof cooperates with the camera 10 to push the camera 10 to rotate, and both the first extending section 341 and the second extending section 342 may extend along a straight line, so that the pushing member 34 is substantially formed in an L-shaped structure. As a result, a structure of the pushing member 34 is simplified, occupied space of the seat 31 and the first turning drive 37 is further reduced, and interference between the camera 10 and the seat 31 during the rotation of the camera 10 is avoided.

In some embodiments, the first driver 24 drives the first shaft 23 to reciprocate in an axis direction of the first shaft 23, the second driver 44 drives the second shaft 43 to reciprocate in an axis direction of the second shaft 43, and both the axis direction of the first shaft 23 and the axis direction of the second shaft 43 are parallel to the first direction. For example, in examples shown by FIGS. 3 and 4, in a process where the first driver 24 drives the first shaft 23 to move, the first shaft 23 may move to the position where the first shaft 23 pivotally engages with the first end 14, and in this case, at least part of the first shaft 23 is inserted into the first end 14. The first shaft 23 may also move to the position where the first shaft 23 disengages from the first end 14, and in this case, the first shaft 23 and the first end 14 are spaced apart. Likewise, in a process where the second driver 44 drives the second shaft 43 to move, the second shaft 43 may move to the position where the second shaft 43 pivotally engages with the second end 15, and in this case, at least part of the second shaft 43 is inserted into the second end 15. The second shaft 43 may also move to the position where the second shaft 43 disengages from the second end 15, and in this case, the second shaft 43 and the second end 15 are spaced apart. Therefore, motion modes of the first shaft 23 and the second shaft 43 are simplified, which is beneficial to simplifying structures of the first driver 24 and the second driver 44, saving occupied space of the first driver 24 and the second driver 44, and facilitates the reasonable layout of the electronic apparatus 200.

Of course, motion of the first shaft 23 and the second shaft 43 is not limited thereto. It will be understood that, the first shaft 23 may be formed as the front shaft 21 described above, and the second shaft 43 may be formed as the rear shaft 41 described above.

Figure 4:
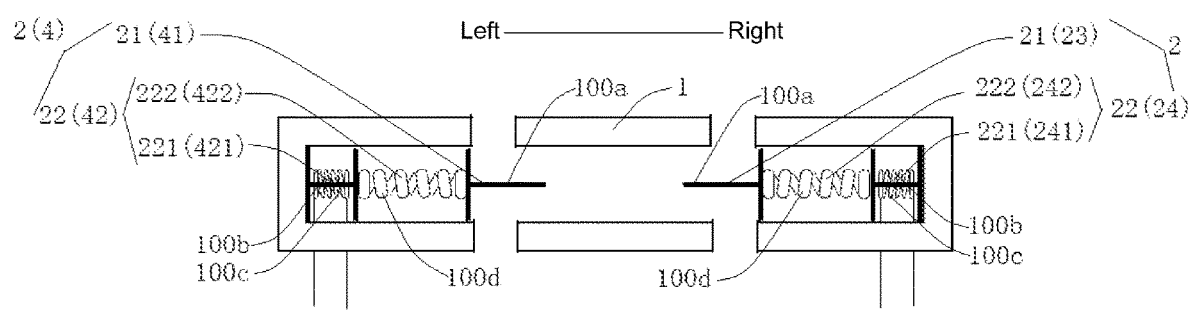
FIG. 4 is a schematic diagram showing that the first shaft and the first driver (or the second shaft and the second driver) shown in FIG. 3 cooperate with the camera, in which the first shaft (or the second shaft) is located at a position where the first shaft (or the second shaft) pivotally engages with the first end (or the second end)
Figure 5:
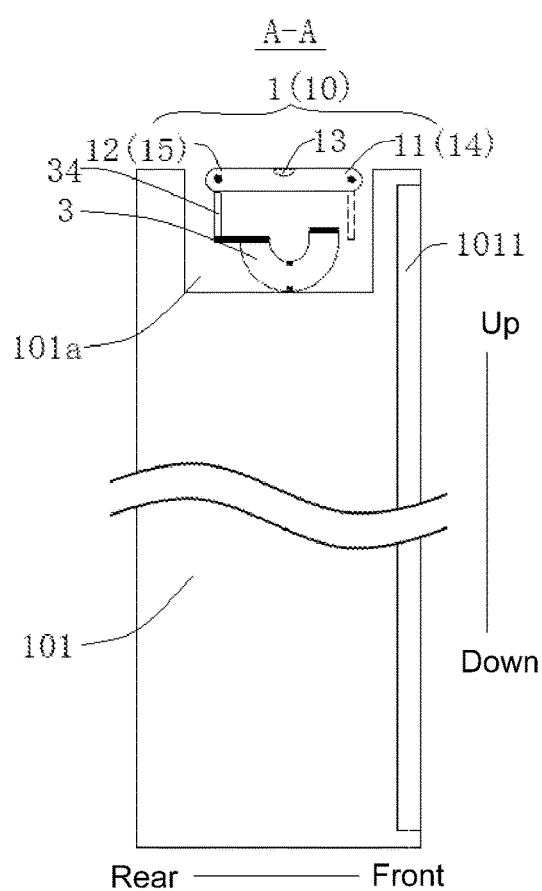
FIG. 5 is a section taking along line A-A in FIG. 1.

In some embodiments, as shown in FIGS. 3 and 4, there are two first drivers 24, and the two first drivers 24 are symmetrically disposed at both sides of the camera 10 along the first direction. Each first driver 24 drives one first shaft 23 to move, so that the two first shafts 23 may be respectively disposed at the both sides of the camera 10 in the first direction, so as to ensure the stability of the camera 10 when rotating around the first shafts 23. Besides, motions of the two first shafts 23 are independent from each other and do not interfere with each other, which facilitates the realization of a redundancy design. Meanwhile, by arranging two first shafts 23, a fitness length of the first shaft 23 and the first end 14 may be shortened, and the motion of the first shaft 23 may be simplified.

For example, as shown in FIGS. 3 and 4, the first driver 24 includes a third electromagnet 241 and a spring 242. The third electromagnet 241 drives the first shafts 23 to move towards the position where the first shaft 23 pivotally engages with the first end 14, and the spring 242 drives the first shaft 23 to move towards the position where the first shaft 23 disengages from the first end 14. As a result, through cooperation between the third electromagnet 241 and the spring 242, reciprocation of the first shaft 23 is realized and smooth rotation of the camera 10 is realized.

For example, the first shaft 23 is a magnet, and when a coil of the third electromagnet 241 is powered on, the third electromagnet 241 exerts an acting force on the first shaft 23 to push the first shaft 23 to move towards the position where the first shaft 23 cooperates with the first end 14. The spring 242 is connected between the third electromagnet 241 and the first shaft 23. In a case where the first shaft 23 moves to the cooperation position, the spring 242 is in a stretched state. If the third electromagnet 242 is powered off, the first shaft 23 moves to the position where the first shaft 23 is separated from the first end 14 under the action of an elastic force exerted by the spring 242.

The drive component 221 described above may be formed as the third electromagnet 241, and the reset component 222 described above may be formed as the spring 242.

In some embodiments, as shown in FIGS. 2, 13 and 17, the structure of the second turning drive 57 is the same as the structure of the first turning drive 37, and the second turning drive 57 and the first turning drive 37 are disposed in a mirroring manner with respect to the lens 13. In addition, the second turning drive 57 and the first turning drive 37 are spaced apart along the first direction. Therefore, the structure of the electronic apparatus 200 is simplified, which is beneficial to the reasonable layout.

In some embodiments, as shown in FIGS. 3 and 4, a structure of the second driver 44 is the same as a structure of the first driver 24, which may also simplify the structure of the electronic apparatus 200.

In some embodiments, as shown in FIGS. 2 and 19, the four outer peripheral sides of the display screen 1011 are the upper side, the lower side, the left side and the right side. The groove 101a is formed in the top of the apparatus body 101, the groove 101a is located at the upper side of the display screen 1011, and the camera 10 is disposed at the top of the apparatus body 101, so that the electronic apparatus 200 better conforms to the user's operation habits. A through hole 101b is formed in the bottom wall of the groove 101a, and the lens 13 is electrically connected to the apparatus body 101 through a flexible circuit board 102. The flexible circuit board 102 penetrates through the through hole 101b to ensure the normal operation of the camera 10 and a more organized wiring arrangement of the electronic apparatus 200.

In some embodiments, as shown in FIGS. 1 to 4, the electronic apparatus 200 further includes a controller 103. The controller 103 is connected to the first driver 24, the second driver 44, the first turning drive 37, and the second turning drive 57, so that the controller 103 may control the motion of the first driver 24, the second driver 44, the first turning drive 37, and the second turning drive 57. The controller 103 is configured to control the camera 10 to switch to the first capture state when receiving a front capture instruction, control the camera 10 to switch to the second capture state when receiving a rear capture instruction, and control the camera 10 to switch to the third capture state when receiving a lateral capture instruction.

When receiving the lateral capture instruction, the controller 103 controls the first turning drive 37 and the second turning drive 57 to be in the initial state, so that the lens 13 finds views towards the outer peripheral side of the display screen 1011. When receiving the front capture instruction, the controller 103 controls the second driver 44 to drive the second shaft 43 to disengage from the second end 15, controls the first driver 24 to drive the first shaft 23 to pivotally engage with the first end 14, and controls the second turning drive 57 to be in the initial state and the first turning drive 37 to rotate in the positive direction, so as to drive the camera 10 to rotate to be in the first capture state. When receiving the rear capture instruction, the controller 103 controls the first driver 24 to drive the first shaft 23 to disengage from the first end 14, controls the second driver 44 to drive the second shaft 43 to pivotally engage with the second end 15, and controls the first turning drive 37 to be in the initial state and the second turning drive 57 to rotate in the reverse direction, so as to drive the camera 10 to rotate to be in the second capture state.

Therefore, the electronic apparatus 200 may have a lateral capture function, a front capture function and a rear capture function, which enriches camera functions of the electronic apparatus 200, and camera pixels in multiple capture directions are consistent.

It will be understood that, in the sentence "the controller 103 is connected to the first driver 24, the second driver 44, the first turning drive 37, and the second turning drive 57", "connected" should be understood in a broad sense, as long as it can be ensured that the controller 103 controls the action of the first driver 24, the second driver 44, the first turning drive 37, and the second turning drive 57.

The camera assembly 100, the control method of the camera assembly 100 and the electronic apparatus 200 will be described in detail below with reference to FIGS. 1 to 22 by using one specific embodiment. It will be understood that, the following descriptions are only illustrative, and are not specific limitations to the present application.

As shown in FIGS. 1 to 4, 9, and 11 to 15, the camera assembly 100 according to the embodiments of the present application includes the camera module 1, the front shaft devices 2, the forward turning drive device 3, the rear shaft devices 4, and the backward turning drive device 5. The camera module 1 includes the front end portion 11, the rear end portion 12, and the lens 13 located at the top between the front end portion 11 and the rear end portion 12. The lens 13 may be located in the middle of the camera module 1 in the front-rear direction.

There are two front shaft devices 2, the two front shaft devices 2 are respectively disposed at a left side and a right side of the camera module 1, and each front shaft device 2 includes the front shaft 21 and the front driver 22. The front shaft 21 is disposed corresponding to the front end portion 11 of the camera module 1, and the front shaft 21 is adapted to pivotally engaging with the front end portion 11, so that the camera module 1 may rotate around the axis of the front shaft 21 when the front shaft 21 pivotally engages with the front end portion 11. The front driver 22 drives the front shaft 21 to move between the position where the front shaft 21 pivotally engages with the front end portion 11 and the position where the front shaft 21 disengages from the front end portion 11.

There are two rear shaft devices 4, the two rear shaft devices 4 are respectively disposed at the left side and the right side of the camera module 1, and each rear shaft device 4 includes the rear shaft 41 and the rear driver 42. The rear shaft 41 is disposed corresponding to the rear end portion 12 of the camera module 1, and the rear shaft 41 is adapted to pivotally engaging with the rear end portion 12, so that the camera module 1 may rotate around the axis of the rear shaft 41 when the rear shaft 41 pivotally engages with the rear end portion 12. The rear driver 42 drives the rear shaft 41 to move between the position where the rear shaft 41 pivotally engages with the rear end portion 12 and the position where the rear shaft 41 disengages from the rear end portion 12.

In a case where the front shaft 21 pivotally engages with the front end portion 11 and the rear shaft 41 disengages from the rear end portion 12, the forward turning drive device 3 may drive the camera module 1 to pivot forward around the front shaft 21, so that the camera module 1 rotates to be in the front capture state where the rear end portion 12 is lifted and the lens 13 finds views forward. In a case where the rear shaft 41 pivotally engages with the rear end portion 12 and the front shaft 21 disengages from the front end portion 11, the backward turning drive device 5 may drive the camera module 1 to pivot backward around the rear shaft 41, so that the camera module 1 rotates to be in the rear capture state where the front end portion 11 is lifted and the lens 13 finds views backward.

Particularly, as shown in FIGS. 9 to 13, there are two front shafts 21, the two front shafts 21 are symmetrically disposed at the left side and the right side of the front end portion 11, the axis of each front shaft 21 extends along a straight line, and each front shaft 21 is driven by one front driver 22. The front driver 22 drives the front shaft 21 to reciprocate along the axis direction of the front shaft 21, and the front driver 22 includes the drive component 221 and the reset component 222. The drive component 221 drives the front shaft 21 to move towards the position where the front shaft 21 pivotally engages with the front end portion 11 and the reset component 222 drives the front shaft 21 to move towards the position where the front shaft 21 disengages from the front end portion 11. The front shaft 21 is the permanent magnet 100*a*, the drive component 221 includes the electromagnet 100*b*, and the electromagnet 100*b* includes the electromagnetic coil 100*c*. When the electromagnetic coil 100*c* is powered on, the electromagnet 100*b* exerts an acting force on the permanent magnet 100*a* to push the front shaft 21 to move towards the cooperation position. The reset component 222 is the spring, the reset component 222 is horizontally disposed, and the reset component 222 is connected between the drive component 221 and the front shaft 21. In a case where the front shaft 21 moves to the cooperation position, the reset component 222 is in the stretched state, the electromagnet 100*b* is powered off, and then the front shaft 21 moves to the separation position under the action of the elastic force exerted by the reset component 222.

Similarly, as shown in FIGS. 11 to 13, 19 and 20, there are two rear shafts 41, and the two rear shafts 41 are symmetrically disposed at a left side and a right side of the rear end portion 12. The axis of each rear shaft 41 extends along a straight line, and each rear shaft 41 is driven by one rear driver 42. The rear driver 42 drives the rear shaft 41 to reciprocate along the axis direction of the rear shaft 41, and the structure of the rear driver 42 is the same as the structure of the front driver 22.

As shown in FIGS. 6, 7 and 13, the forward turning drive device 3 includes the seat 31, the slider 32, the drive 33, the pushing member 34, the reset member 35, and the position-limiting member 36. The seat 31 extends along an arc, the seat 31 defines the arc-shaped slideway 311, and the arc-shaped slideway 311 extends along the arc shape thereof first downward and then upward in the direction from the front to the rear. The slider 32 is arc-shaped and the slider 32 is slidably arranged in the arc-shaped slideway 311, and the curvature of the slider 32 is the same as the curvature of the arc-shaped slideway 311. A central angle corresponding to the slider 32 is approximately 90°, and a central angle corresponding to the arc-shaped slideway 311 is greater than 90°, so as to facilitate the arrangement of the drive 33 and the reset member 35.

Particularly, the drive 33 is the spring disposed between the slider 32 and the seat 31, and the drive 33 is used for pushing the slider 32 to rotate clockwise, so that the slider 32 slides out upward from the rear end of the arc-shaped slideway 311. The reset member 35 is disposed at the front end of the arc-shaped slideway 311, the reset member 35 is the electromagnet 100*b*, and the reset member 35 is used for pushing the slider 32 to rotate counterclockwise, so that the slider 32 is pulled downward into the arc-shaped slideway 311. The pushing member 34 is disposed at one end of the arc of the slider 32, and one end of the pushing member 34 cooperates with the camera module 1. In the process where the slider 32 rotates clockwise, the pushing member 34 may rotate clockwise along with the slider 32 to push the camera module 1 to rotate to be in the front capture state.

The position-limiting member 36 is arranged outside the slider 32, the position-limiting member 36 is disposed in the middle of the arc-shaped slideway 311, and the position-limiting member 36 is the electromagnet 100*b*. In a case where the camera module 1 rotates to be in the front capture state, the position-limiting member 36 restricts the slider 32 from continuing to rotate clockwise, so as to limit the rotation angle of the camera module 1 and keep the camera module 1 in the front capture state.

Likewise, as shown in FIGS. 2 to 4, 14 and 15, the structure of the backward turning drive device 5 is mirrored with the structure of the forward turning drive device 3, then the structure of the backward turning drive device 5 and the structure of the forward turning drive device 3 are the same. The backward turning drive device 5 and the forward turning drive device 3 may be symmetrically disposed in the front-rear direction with respect to the lens 13, and the backward turning drive device 5 and the forward turning drive device 3 are spaced apart along the turning axis direction of the camera module 1. The axis direction of the front shaft 21 is parallel to the axis direction of the rear shaft 41 and both horizontally extend along the left-right direction. In a case where the camera module 1 rotates around the front shaft 21, the turning axis of the camera module 1 is the axis of the front shaft 21, and in a case where the camera module 1 rotates around the rear shaft 41, the turning axis of the camera module 1 is the axis of the rear shaft 41.

In a case where the camera module 1 is not in use, the camera module 1 may be in the top capture state. In this case, the pushing member 34 is located at a lower side of the rear end portion 12 and abuts against an outer wall of the rear end portion 12, and the rear pushing member 54 is located at a lower side of the front end portion 11 and abuts against an outer wall of the front end portion 11. In a case where the camera module 1 is in use, the user may choose a capture angle. If the camera module 1 is required for top capture, then the camera module 1 is kept in the top capture state, and the camera module 1 starts to work. If the camera module 1 is required for front capture, the front driver 22 drives the front shaft 21 to pivotally engage with the front end portion 11, the rear driver 42 drives the rear shaft 41 to disengage from the rear end portion 12, and the forward turning drive device 3 drives the camera module 1 to pivot forward around the front shaft 21 from the top capture state, so that the camera module 1 rotates to be in the front capture state where the rear end portion 12 is lifted and the lens 13 finds views forward, and then the camera module 1 starts to work. In the above process, the pushing member 34 is in sliding contact or rolling contact with the bottom face of the camera module 1, and the pushing member 34 gradually approaches to the front end portion 11. If the camera module 1 is required for rear capture, the rear driver 42 drives the rear shaft 41 to pivotally engage with the rear end portion 12, the front driver 22 drives the front shaft 21 to disengage from the front end portion 11, and the backward turning drive device 5 drives the camera module 1 to pivot backward around the rear shaft 41 from the top capture state, so that the camera module 1 rotates to be in the rear capture state where the front end portion 11 is lifted and the lens 13 finds views backward, and then the camera module 1 starts to work. In the above process, the rear pushing member 54 is in sliding contact or rolling contact with the bottom face of the camera module 1, and the rear pushing member 54 gradually approaches to the rear end portion 12.

The outer walls of both the front end portion 11 and the rear end portion 12 are formed as circular-arc-shaped walls. In the process where the forward turning drive device 3 drives the camera module 1 to pivot forward around the front shaft 21, the rear pushing member 54 of the backward turning drive device 5 may be in sliding contact or rolling contact with the outer wall of the rear end portion 12, so that the rear pushing member 54 will not interfere with the normal rotation of the camera module 1. Likewise, in the process where the backward turning drive device 5 drives the camera module 1 to pivot backward around the rear shaft 41, the pushing member 34 of the forward turning drive device 3 may be in sliding contact or rolling contact with the outer wall of the front end portion 11, so that the pushing member 34 will not interfere with the normal rotation of the camera module 1.

The camera assembly 100 according to the embodiments of the present application enriches the camera functions of the electronic apparatus 200, ensures that the camera pixels of the electronic apparatus 200 in different view finding directions are consistent, which is beneficial to reducing costs, and facilitates realization of the full screen display of the electronic apparatus 200.

As shown in FIGS. 1 to 4, 14 and 15, the electronic apparatus 200 includes the apparatus body 101 and the camera assembly 100, and the top wall of the apparatus body 101 is formed with the groove 101a that is recessed from the top to the bottom. Only the top of the groove 101a is open, that is, the groove 101a has the front side wall, the rear side wall, the left side wall, the right side wall, and the bottom wall. The seat 31 and the rear seat 51 are fixed in the groove 101a, so as to make the camera module 1 embedded in the groove 101a. In a case where the camera module 1 is in the top capture state where the lens 13 finds views upward, the top face of the camera module 1 is flush with the top wall of the apparatus body 101; in a case where the camera module 1 rotates to the front capture state, the rear end portion 12 of the camera module 1 rotates above the groove 101a and the lens 13 is higher than the groove 101a, so as to ensure the normal view finding and capture of the lens 13; and in a case where the camera module 1 rotates to the rear capture state, the front end portion 11 of the camera module 1 rotates above the groove 101a and the lens 13 is higher than the groove 101a, so as to ensure that the lens 13 normally finds views and takes a picture or shoots a video backward.

The through hole 101b is formed in a wall of the groove 101a, the lens 13 is connected to a mainboard of the electronic apparatus 200 through the flexible circuit board 102, and the electromagnet 100b is electrically connected to a battery of the electronic apparatus 200. The flexible circuit board 102 penetrates through the through hole 101b, and a connecting line between the electromagnet 100b and the battery also penetrates through the through hole 101b, so as to ensure an organized wiring arrangement of the electronic apparatus 200. The through hole 101b may be formed in the bottom wall of the groove 101a, and the through-hole 101b is located between the forward turning drive device 3 and the backward turning drive device 5. Of course, the through hole 101b may also be formed in another wall of the groove 101a.

The electronic apparatus 200 according to the embodiments of the present application has a plurality of capture angles by adopting the camera assembly 100, and realizes a top capture function, a front capture function and a rear capture function, which enriches camera functions of the electronic apparatus 200, reduces costs, facilitates the realization of the full screen display of the electronic apparatus 200, and improves the user experience.

In the description of the present application, it should be understood that orientations or positional relationships indicated by terms "center", "upper/upward/up", "lower/downward/down", "left", "right", "vertical", "horizontal", etc. are based on orientations or positional relationships shown in the accompanying drawings, which are merely to facilitate and simplify the description of the present application, and are not to indicate or imply that the referred devices or elements must have a particular orientation, or must be constructed and operated in a particular orientation. Therefore, they should not be construed as limitations to the present application. In the description of the present application, "a/the plurality of/multiple" means two or more.

In the description of the description, descriptions of the reference terms "one embodiment", "some embodiments", "exemplary embodiments", "examples", "specific examples", or "some examples", etc, are intended to indicate that specific features, structures, materials or characteristics related to the embodiment(s) or the example(s) are included in at least one embodiment or example of the present application. In the description, schematic representations of the above terms do not necessarily refer to the same embodiment or example. In addition, specific features, structures, materials or characteristics may be combined in any one or more embodiments or examples in any suitable manner.

Although the embodiments of the present application have been shown and described, a person of ordinary skill in the art may understand that various changes, modifications, substitutions, and variations may be made to these embodiments without departing from the principle and purpose of the present application. The scope of the present application is subject to the claims and their equivalents.

What is claimed is:

1. A camera assembly, comprising:
 a camera module, the camera module including a strip-shaped body, the strip-shaped body including a front end portion, a rear end portion, and a lens located at a top of the strip-shaped body between the front end portion and the rear end portion, and the front end portion, the rear end portion and the lens are sequentially disposed along a front-to-rear direction;
a front shaft device, the front shaft device including at least one front shaft and a front driver, each front shaft being adapted to pivotally engaging-with the front end portion, the front driver driving the front shaft to move between a position where the front shaft pivotally engages with the front end portion and a position where the front shaft disengages from the front end portion, and the front driver driving the front shaft to rotate back and forth in an axis direction of the front shaft; and
a forward turning drive device, the front shaft pivotally engaging with the front end portion, and the forward turning drive device driving the camera module to pivot forward around the front shaft, so that the camera module rotates to be in a front capture state where the rear end portion is lifted and the lens finds views forward.

2. The camera assembly according to claim 1, wherein the forward turning drive device includes:
a seat;
a slider, the slider being in a shape of an arc and disposed on the seat to rotate around a center of the arc;
a drive, the drive being used to push the slider to rotate clockwise; and
a pushing member, the pushing member being disposed at one end of the arc of the slider, wherein the slider rotates clockwise and the pushing member pushes the camera module to rotate to be in the front capture state.

3. The camera assembly according to claim 2, wherein the forward turning drive device further includes a reset member, the reset member is used to push the slider to rotate counterclockwise; the camera module is in the front capture state and the slider rotates counterclockwise, and the camera module rotates back to be in a top capture state where the rear end portion drops down and the lens finds views upward; or
the forward turning drive device includes a position-limiting member; the camera module rotates to be in the front capture state, and the position-limiting member at least restricts the slider from continuing to rotate clockwise; or
the forward turning drive device includes a reset member and a position-limiting member; the reset member is used to push the slider to rotate counterclockwise; the camera module is in the front capture state and the slider rotates counterclockwise, and the camera module rotates back to a top capture state where the rear end portion drops down and the lens finds views upward; the camera module rotates to be in the front capture state, and the position-limiting member at least restricts the slider from continuing to rotate clockwise.

4. The camera assembly according to claim 2, wherein the seat defines an arc-shaped slideway, and the slider is slidably arranged in the arc-shaped slideway;
the arc-shaped slideway extends along an arc shape thereof first downward and then upward along a direction from front to rear;
a front end of the arc-shaped slideway is provided with a reset member, and a middle of the arc-shaped slideway is provided with a position-limiting member;
a front end of the slider is provided with a permanent magnet that slides between the reset member and the position-limiting member;
the reset member is an electromagnet and is used to push the slider to rotate counterclockwise; the position-limiting member is an electromagnet, and the camera module rotates to be in the front capture state and the position-limiting member at least restricts the slider from continuing to rotate clockwise; and the drive is a spring connected between the reset member and the front end of the slider.

5. The camera assembly according to claim 4, wherein the pushing member is disposed outside the arc-shaped slideway and includes a first extending section and a second extending section, the first extending section extends outward from a rear end of the slider along a radial direction of the slider, and the second extending section extends from a tail end of the first extending section along an extending direction thereof and extends along a direction perpendicular to the first extending section towards a direction away from the slider.

6. The camera assembly according to claim 2, wherein a bottom face of the camera module has a sliding groove, and the pushing member pushes the camera module to rotate and the pushing member slides along the sliding groove.

7. The camera assembly according to claim 1, wherein the front driver includes a drive component and a reset component, the drive component drives the front shaft to move towards the position where the front shaft pivotally engages with the front end portion, and the reset component drives the front shaft to move towards the position where the front shaft disengages from the front end portion.

8. The camera assembly according to claim 7, wherein the front shaft is a permanent magnet, the drive component includes an electromagnet, the reset component is a spring, and the reset component is connected between the drive component and the front shaft.

9. The camera assembly according to claim 1, wherein at least one front shaft includes two front shafts, the two front shafts are symmetrically disposed at both sides of the front end portion in a left-right direction, and each front shaft is driven by one front driver.

10. The camera assembly according to claim 1, comprising:
a rear shaft device, the rear shaft device including a rear driver and a rear shaft, and the rear driver driving the rear shaft to move between a position where the rear shaft pivotally engages with the rear end portion and a position where the rear shaft disengages from the rear end portion; and
a backward turning drive device, the rear shaft pivotally engaging with the rear end portion and the front shaft disengaging from the front end portion, and the backward turning drive device driving the camera module to pivot backward around the rear shaft, so that the camera module rotates to be in a rear capture state where the front end portion is lifted and the lens finds views backward.

11. The camera assembly according to claim 10, wherein a structure of the backward turning drive device is mirrored with a structure of the forward turning drive device, and the backward turning drive device and the forward turning drive device are spaced apart along a turning axis direction of the camera module; or
a structure of the rear driver is a same as a structure of the front driver; or
a structure of the backward turning drive device is mirrored with a structure of the forward turning drive device, and the backward turning drive device and the forward turning drive device are spaced apart along a turning axis direction of the camera module; and a structure of the rear driver is a same as a structure of the front driver.

12. A control method of a camera assembly according to claim 10, the control method comprising the following steps:
in a case where the camera module is used for top capture, keeping the forward turning drive device in an initial state and keeping the backward turning drive device in an initial state, so as to keep the camera module in a top capture state where the lens finds views upward;
in a case where the camera module is used for front capture, driving, by the rear driver, the rear shaft to disengage from the rear end portion, and driving, by the front driver, the front shaft to pivotally engage with the front end portion, so that the backward turning drive device is in the initial state, and the forward turning drive device drives the camera module to rotate to be in the front capture state; and
in a case where the camera module is used for rear capture, driving, by the front driver, the front shaft to disengage from the front end portion, and driving, by the rear driver, the rear shaft to pivotally engage with the rear end portion, so that the forward turning drive device is in the initial state, and the backward turning drive device drives the camera module to rotate to be in the rear capture state.

13. An electronic apparatus, comprising:
an apparatus body; and
a camera assembly according to claim 1, and the camera assembly being disposed on the apparatus body; wherein
a top wall of the apparatus body is formed with a groove that is recessed from top to bottom, only a top of the groove is open, and the camera module is embedded in the groove,
the camera module is in a top capture state where the lens finds views upward and a top face of the camera module is flush with the top wall of the apparatus body; and the camera module rotates to be in the front capture state, and the rear end portion of the camera module rotates above the groove and the lens is higher than the groove.

14. An electronic apparatus, comprising:
an apparatus body including a display screen, wherein the display screen has a square structure and has a light exit side, an opposite side opposite to the light exit side and four outer peripheral sides; the display screen includes four outer edges, and the outer edges are correspondingly located at the outer peripheral sides of the display screen respectively; and the apparatus body is provided with a groove, and the groove is located at the opposite side of the display screen and is located at at least one outer peripheral side of the display screen;
a camera disposed in the groove, wherein the camera has a strip-shaped structure extending along a first direction, the strip-shaped structure includes a first end, a second end and a lens, and the first end, the lens and the second end are sequentially disposed along a second direction; and the first direction is parallel to an extending direction of a plane where the outer edges of the display screen are located, and the second direction is a direction from the light exit side of the display screen to the opposite side of the display screen, and is perpendicular to the first direction;
a first shaft disposed between the first end and a first driver, and used to pivotally engage with the first end;
a first driver disposed in the groove and connected to the first shaft, wherein the first driver is configured to drive the first shaft to pivotally engage with the first end or drive the first shaft to disengage from the first end;
a second shaft disposed between the second end and a second driver, and used to pivotally engage with the second end;
a second driver disposed in the groove and connected to the second shaft, wherein the second driver is configured to drive the second shaft to pivotally engage with the second end or drive the second shaft to disengage from the second end;
a first turning drive having a strip-shaped arc structure, wherein the first turning drive rotates around a center of an arc curve of the first turning drive; one end of the first turning drive in a circumferential direction is formed as a first drive end, the first drive end cooperates with the second end, so that the first turning drive drives the camera to rotate around the first shaft to be in a first capture state; and in the first capture state, the second end is lifted and the lens finds views towards the light exit side of the display screen; and
a second turning drive having a strip-shaped arc structure, wherein the second turning drive rotates around a center of an arc curve of the second turning drive; one end of the second turning drive in a circumferential direction is formed as a second drive end, the second drive end cooperates with the first end, so that the second turning drive drives the camera to rotate around the second shaft to be in a second capture state; and in the second capture state, the first end is lifted and the lens finds views towards the opposite side of the display screen.

15. The electronic apparatus according to claim 14, wherein a seat is arranged on an outer side of the first turning drive, the seat is in a shape of an arc, and the first turning drive rotates around the center of the arc curve of the first turning drive relative to the seat, wherein
another end of the first turning drive in the circumferential direction is formed as a first free end, and an elastic member is disposed between the first free end and a corresponding end of the seat in the circumferential direction;
a pushing member is arranged at the first drive end, and the pushing member abuts against the second end; and the elastic member is used to push the first turning drive to rotate in a positive direction to drive the pushing member to push the camera to rotate to be in the first capture state;
a magnet is arranged at the first free end, and a first electromagnet is arranged at one end of the seat in a circumferential direction corresponding to the first free end;
the first electromagnet cooperates with the magnet to push the first turning drive to rotate in a reverse direction, so that the camera rotates from the first capture state to a third capture state; and in the third capture state, the second end drops down to be aligned with the first end, and the lens finds views towards an outer peripheral side of the display screen;
the first driver drives the first shaft to rotate back and forth along an axis direction of the first shaft, the second driver drives the second shaft to rotate back and forth along an axis direction of the second shaft, and both the axis direction of the first shaft and the axis direction of the second shaft are parallel to the first direction;

a second electromagnet is disposed in the seat; the second electromagnet is disposed in a middle of the seat in a circumferential direction, and cooperates with the magnet to at least limit a positive rotation angle of the first turning drive; and the pushing member is disposed outside the seat and includes a first extending section and a second extending section; and the first extending section extends outward from the first drive end along a radial direction of the first turning drive, and the second extending section extends from a tail end of the first extending section along an extending direction thereof and extends along a direction perpendicular to the first extending section towards a direction away from the first turning drive.

16. The electronic apparatus according to claim 15, wherein a number of first drivers is two, two first drivers are symmetrically disposed at both sides of the camera along the first direction, each first driver drives one first shaft to move, and the first driver includes:

a third electromagnet and a spring, wherein the third electromagnet drives the first shaft to move towards a position where the first shaft pivotally engages with the first end, and the spring drives the first shaft to move towards a position where the first shaft disengages from the first end.

17. The electronic apparatus according to claim 14, wherein a structure of the second turning drive and a structure of the first turning drive are same and disposed in a mirroring manner, the second turning drive and the first turning drive are spaced apart along the first direction, and a structure of the second driver and a structure of the first driver are same.

18. The electronic apparatus according to claim 14, wherein the four outer peripheral sides of the display screen are an upper side, a lower side, a left side and a right side; the groove is formed at a top of the apparatus body and is located at the upper side of the display screen, and a through hole is formed in a bottom wall of the groove; and the lens is electrically connected to the apparatus body through a flexible circuit board, and the flexible circuit board penetrates through the through hole.

19. The electronic apparatus according to claim 14, comprising a controller connected to the first driver, the second driver, the first turning drive and the second turning drive, wherein the controller is configured to control the camera to switch to the first capture state when receiving a front capture instruction, control the camera to switch to the second capture state when receiving a rear capture instruction, and control the camera to switch to the third capture state when receiving a lateral capture instruction; wherein when receiving the lateral capture instruction, the controller controls the first turning drive and the second turning drive to be in the initial state, so that the lens finds views towards an outer peripheral side of the display screen;

when receiving the front capture instruction, the controller controls the second driver to drive the second shaft to disengage from the second end, controls the first driver to drive the first shaft to pivotally engage with the first end, and controls the second turning drive to be in the initial state and the first turning drive to rotate in a positive direction, so as to drive the camera to rotate to be in the first capture state; and when receiving the rear capture instruction, the controller controls the first driver to drive the first shaft to disengage from the first end, controls the second driver to drive the second shaft to pivotally engage with the second end, and controls the first turning drive to be in the initial state and the second turning drive to rotate in a reverse direction, so as to drive the camera to rotate to be in the second capture state.

* * * * *

UNITED STATES PATENT AND TRADEMARK OFFICE
CERTIFICATE OF CORRECTION

PATENT NO. : 11,284,009 B2  
APPLICATION NO. : 17/059613  
DATED : March 22, 2022  
INVENTOR(S) : Xiangxiang Zou It is certified that error appears in the above-identified patent and that said Letters Patent is hereby corrected as shown below:

In the Specification

Figure 15:
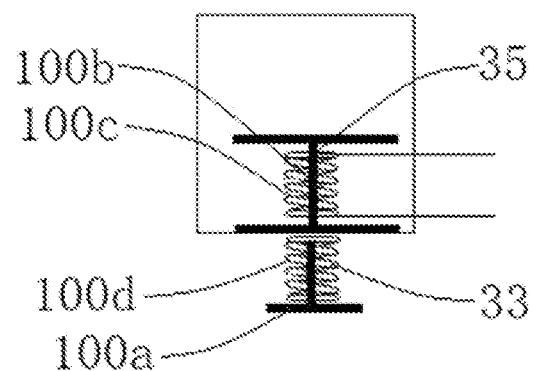
FIG. 15 is a partial schematic diagram of the first turning drive shown in FIG.
Figure 16:
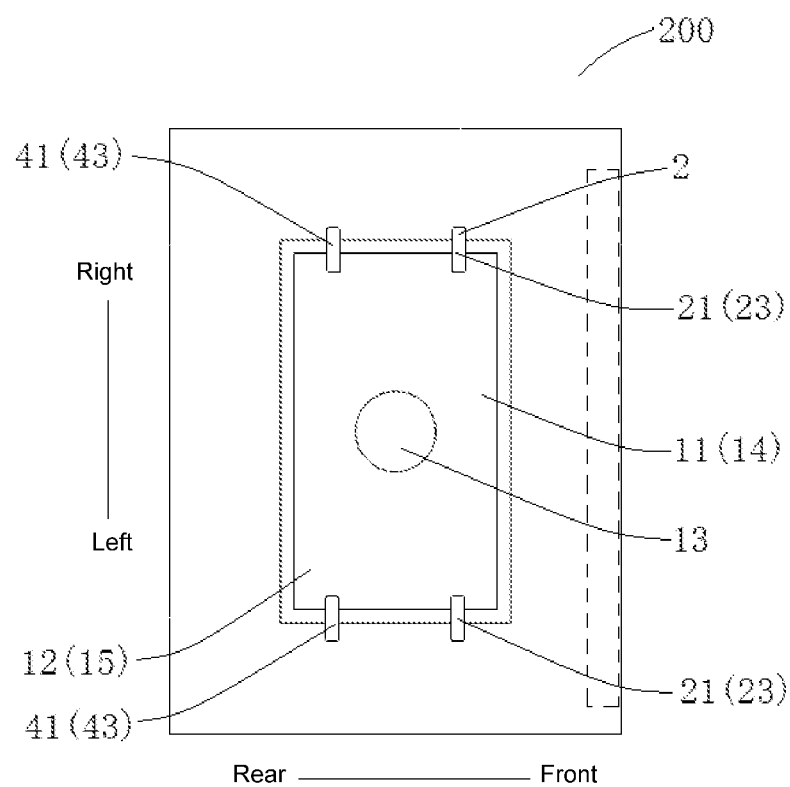
FIG. 16 is a schematic diagram of the electronic apparatus shown in FIG. 1, in which the camera is in the top capture state.

Column (7), Lines 53-54 of the "BRIEF DESCRIPTION OF THE DRAWINGS" should read as follows: "FIG. 15 is a partial schematic diagram of the first turning drive shown in FIG. 13;"

Signed and Sealed this  
Sixth Day of September, 2022

Katherine Kelly Vidal  
*Director of the United States Patent and Trademark Office*